US011412546B2

(12) United States Patent
Yano et al.

(10) Patent No.: US 11,412,546 B2
(45) Date of Patent: **\*Aug. 9, 2022**

(54) WIRELESS COMMUNICATIONS SYSTEM, COMMUNICATIONS APPARATUS, AND PROCESSING METHOD

(71) Applicant: FUJITSU LIMITED, Kawasaki (JP)

(72) Inventors: Tetsuya Yano, Yokohama (JP); Yoshinori Tanaka, Yokohama (JP); Michiharu Nakamura, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,180

(22) Filed: Jan. 13, 2020

(65) Prior Publication Data
US 2020/0154478 A1 May 14, 2020

Related U.S. Application Data

(63) Continuation of application No. 15/604,802, filed on May 25, 2017, now Pat. No. 10,568,137, which is a
(Continued)

(51) Int. Cl.
*H04W 74/08* (2009.01)
*H04W 48/18* (2009.01)
(Continued)

(52) U.S. Cl.
CPC ....... *H04W 74/0816* (2013.01); *H04W 16/14* (2013.01); *H04W 48/18* (2013.01);
(Continued)

(58) Field of Classification Search
CPC ........... H04W 74/0816; H04W 74/004; H04W 74/006; H04W 16/14; H04L 12/44; H04L 12/6418; H04L 12/417
See application file for complete search history.

(56) References Cited

U.S. PATENT DOCUMENTS 7,013,158 B1 3/2006 Cook
8,542,646 B1 9/2013 Ding
(Continued)

FOREIGN PATENT DOCUMENTS

CN 102812772 A 12/2012
JP 2006-203361 A 8/2006
(Continued)

OTHER PUBLICATIONS

Notice of Allowance issued by the United States Patent and Trademark Office for corresponding U.S. Appl. No. 15/604,802, dated Oct. 17, 2019.
(Continued)

*Primary Examiner* — Jamal Javaid
(74) *Attorney, Agent, or Firm* — Myers Wolin, LLC

(57) ABSTRACT

A wireless communications system includes a base station; and a terminal; wherein the base station includes a transmitter configured to transmit to the terminal using a physical downlink control channel, information used for assignment of first candidate and second candidate of a utilization resource in an unlicensed band for transmitting a wireless signal; and a receiver configured to receive the wireless signal from the terminal; and the terminal includes a receiver configured to receive the information; and a transmitter configured to transmit the wireless signal to the base station using the first candidate when the first candidate is idle, or using the second candidate when the first candidate is not idle and the second candidate is idle; and wherein the assignment of the first candidate and the second candidate by the base station is performed by allocating a plurality of subframes.

10 Claims, 32 Drawing Sheets

Related U.S. Application Data continuation of application No. PCT/JP2014/083793, filed on Dec. 19, 2014.

(51) Int. Cl.

| | |
|---|---|
| *H04W 16/14* | (2009.01) |
| *H04W 74/00* | (2009.01) |
| H04W 72/12 | (2009.01) |
| H04W 84/04 | (2009.01) |
| H04W 84/12 | (2009.01) |

(52) U.S. Cl.
CPC ....... *H04W 74/004* (2013.01); *H04W 74/006* (2013.01); *H04W 72/1252* (2013.01); *H04W 84/042* (2013.01); *H04W 84/12* (2013.01)

(56) References Cited

U.S. PATENT DOCUMENTS

| | | | |
|---|---|---|---|
| 2006/0094431 | A1 | 5/2006 | Saifullah et al. |
| 2009/0092105 | A1 | 4/2009 | Chou |
| 2010/0248631 | A1 | 9/2010 | Chaudhri et al. |
| 2011/0228666 | A1* | 9/2011 | Barbieri ............... H04W 76/14 370/216 |
| 2013/0102313 | A1 | 4/2013 | Tinnakornsrisuphap et al. |
| 2014/0293789 | A1 | 10/2014 | Machida |
| 2015/0003417 | A1 | 1/2015 | Akiyoshi et al. |
| 2015/0139106 | A1 | 5/2015 | Masuda et al. |

FOREIGN PATENT DOCUMENTS

| | | | |
|---|---|---|---|
| JP | 2006-229420 | A | 8/2006 |
| JP | 2007-312078 | A | 11/2007 |
| JP | 2008-518541 | A | 5/2008 |
| JP | 2008-301075 | A | 12/2008 |
| JP | 2012-253760 | A | 12/2012 |
| JP | 2013-523018 | A | 6/2013 |
| JP | 2013-162377 | A | 8/2013 |
| JP | 2013-175983 | A | 9/2013 |
| JP | 2013-255143 | A | 12/2013 |
| JP | 2014-514863 | A | 6/2014 |
| JP | 2014-200035 | A | 10/2014 |
| RU | 2 442 288 | C2 | 2/2012 |
| WO | 2011/116017 | A1 | 9/2011 |

OTHER PUBLICATIONS

Communication pursuant to Article 94(3) EPC issued by the European Patent Office for corresponding European Patent Application No. 14 908 472.5-1212, dated Feb. 28, 2020.
Notification of Results of Substantive Examination issued by the Directorate General of Intellectual Property Rights at the Ministry of Law and Human Rights of Republic of Indonesia for corresponding Indonesian Patent Application No. PID201703781, dated Sep. 16, 2020, with a partial English translation.
Office Action issued by Intellectual Property India for corresponding Indian Patent Application No. 201737019917, dated Mar. 16, 2020, with an English translation.
International Search Report issued for corresponding International Patent Application No. PCT/JP2014/083793, dated Mar. 17, 2015.
International Preliminary Report on Patentability issued for corresponding International Patent Application No. PCT/JP2014/083793, dated Mar. 17, 2015, with English translation of the relevant part.
Ratasuk et al., "LTE in Unlicensed Spectrum using Licensed-Assisted Access", 2014 IEEE Globecom Workshops (GC WKSHPS), IEEE, Dec. 8, 2014, pp. 746-751.
Extended European search report with supplementary European search report and the European search opinion issued by the European Patent Office for corresponding European Patent Application No. 14908472.5, dated Dec. 1, 2017.
Office Action issued by the Canadian Intellectual Property Office for corresponding Canadian Patent Application No. 2,970,861, dated Apr. 16, 2018.
Notification of Reasons for Refusal issued by the Japan Patent Office for corresponding Japanese Patent Application No. 2016-564658, dated May 22, 2018, with an English translation.
Official Action issued by Rospatent Federal Service for Intellectual Property for corresponding Russian Patent Application No. 2017120477/08(035531), dated Jul. 17, 2018, with a partial English translation.
Search Report issued by Rospatent Federal Service for Intellectual Property for corresponding Russian Patent Application No. 2017120477/08(035531), dated Jul. 17, 2018, with a partial English translation.
Interdigital Communications, "Multiple Transmission Pools for ProSe Communications", Agenda Item: 7.3.2.1, 3GPP TSG-RAN WG2 meeting #88, R2-145204, San Francisco, USA, Nov. 17-21, 2014.
Potevio, "Resource allocation Mode 2 for D2D communication", Agenda Item: 6.2.5.2.1, 3GPP TSG-RAN WG1 meeting #77, R1-142512, Seoul, Korea, May 19-23, 2014.
LG Electronics, "Discussion on procedures for D2DSS transmission and reception", Agenda Item: 6.2.5.3.3, 3GPP TSG-RAN WG1 meeting #77, R1-142159, Seoul, Korea, May 19-23, 2014.
Notice of Preliminary Rejection issued by the Korean Intellectual Property Office for corresponding Korean Patent Application No. 10-2017-7015633, dated Aug. 30, 2018, with English translation.
Notice of Final Rejection issued by the Korean Intellectual Property Office for corresponding Korean Patent Application No. 10-2017-7015633, dated Apr. 19, 2019, with English translation.
Second Notice of Final Rejection issued by the Korean Intellectual Property Office for corresponding Korean Patent Application No. 10-2017-7015633 dated Jun. 21, 2019 with a partial English translation.
First Notification of Office Action issued for corresponding Chinese Patent Application 201480084102.4 dated Aug. 7, 2019 with partial English translation.
Non-Final Office Action issued by the United States Patent and Trademark Office for corresponding U.S. Appl. No. 15/604,802, dated Oct. 22, 2018.
Final Office Action issued by the United States Patent and Trademark Office for corresponding U.S. Appl. No. 15/604,802, dated Mar. 11, 2019.
Notice of Allowance issued by the United States Patent and Trademark Office for corresponding U.S. Appl. No. 15/604,802, dated Oct. 27, 2019.
Second Notification of Office Action issued by the China National Intellectual Property Administration for corresponding Chinese Patent Application No. 201480084102.4, dated Feb. 6, 2020, with an English translation.
Decision of Rejection issued by the China National Intellectual Property Administration for corresponding Chinese Patent Application No. 201480084102.4, dated May 27, 2020, with an English translation.

* cited by examiner

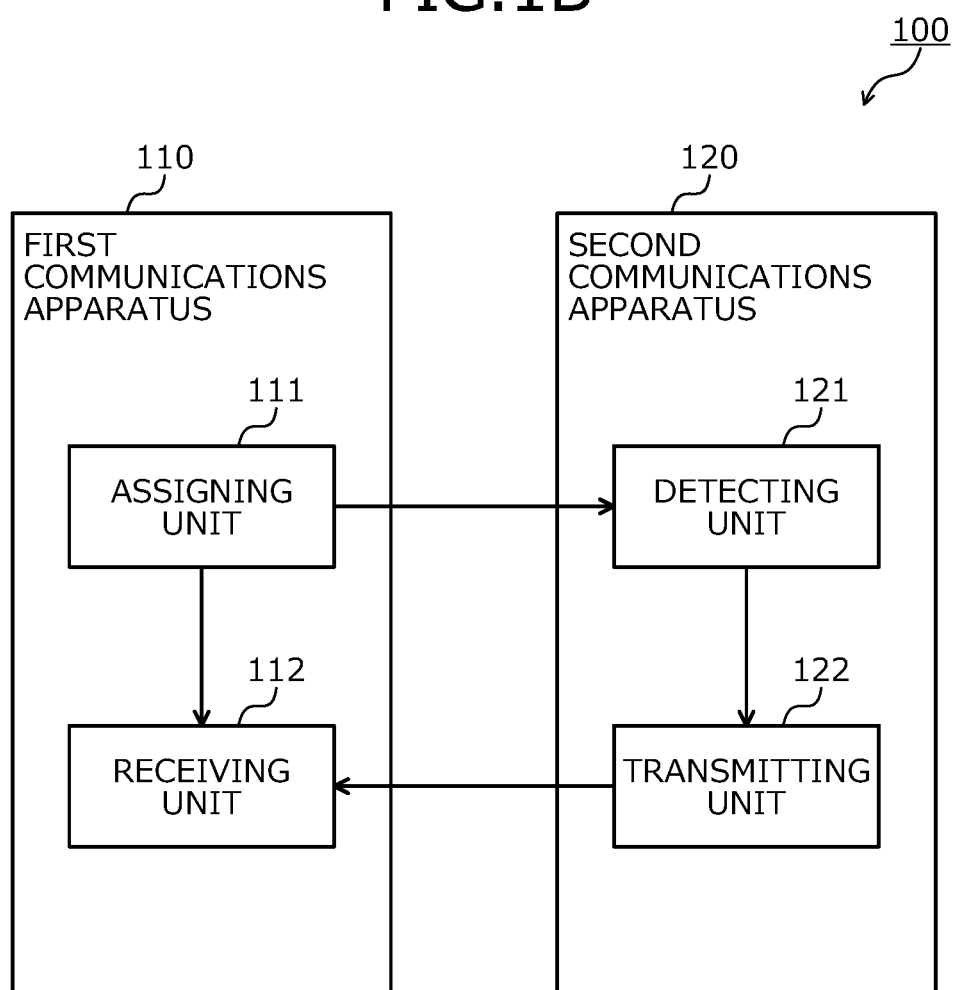

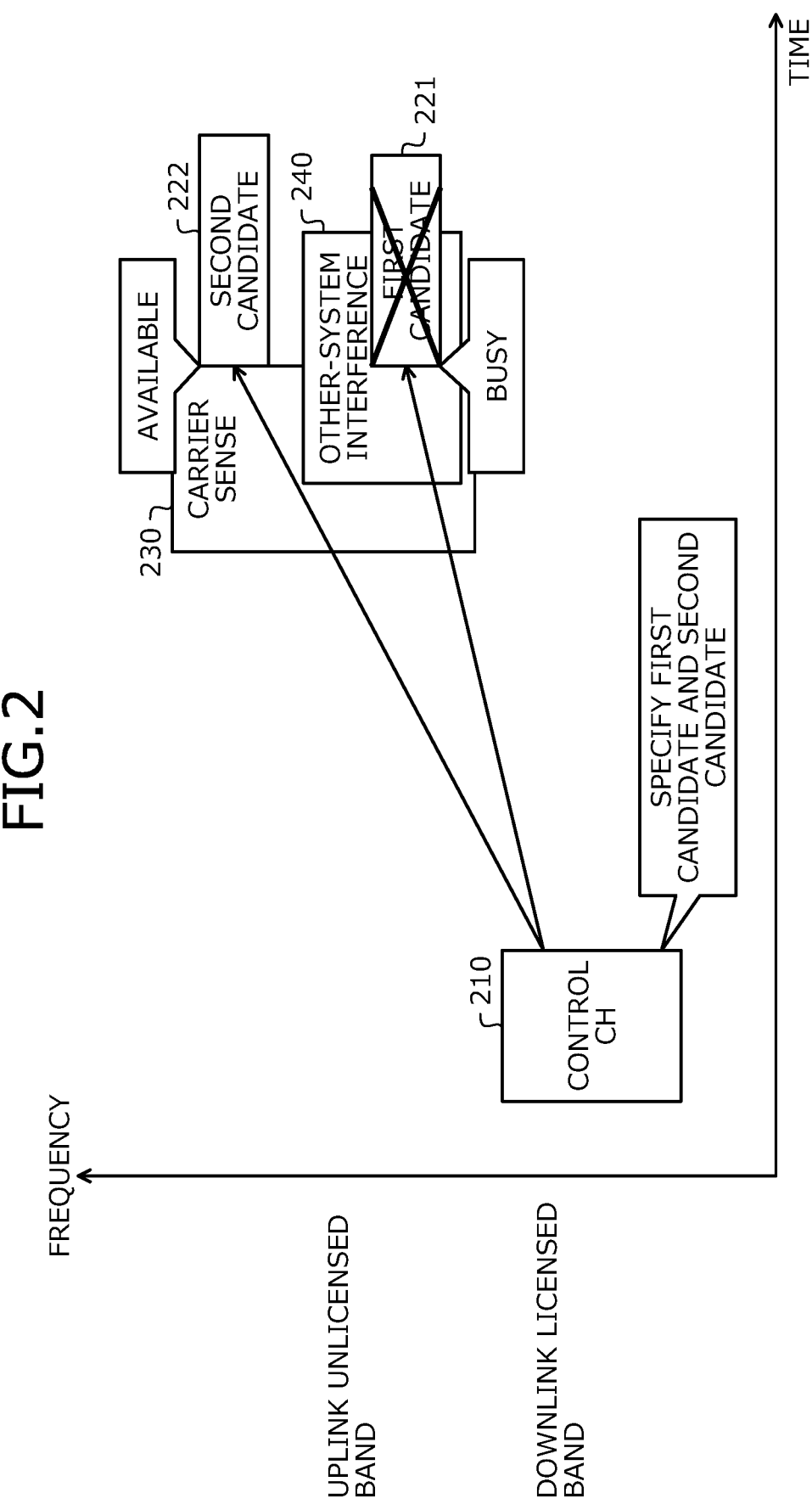

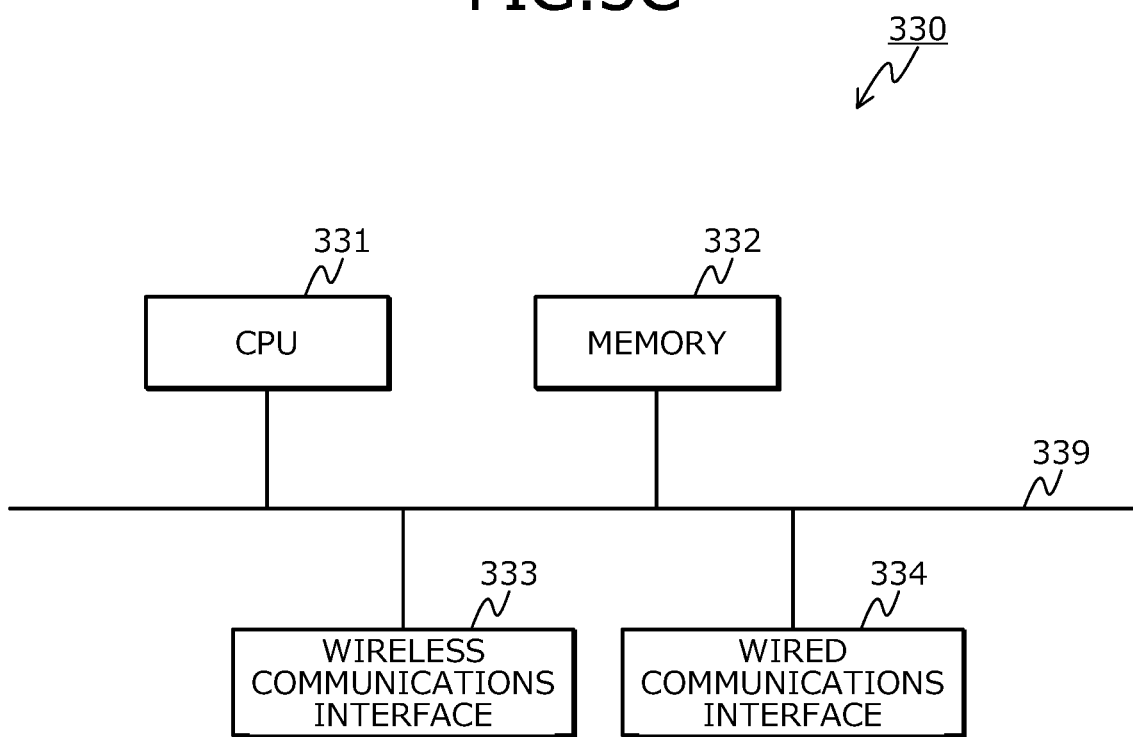

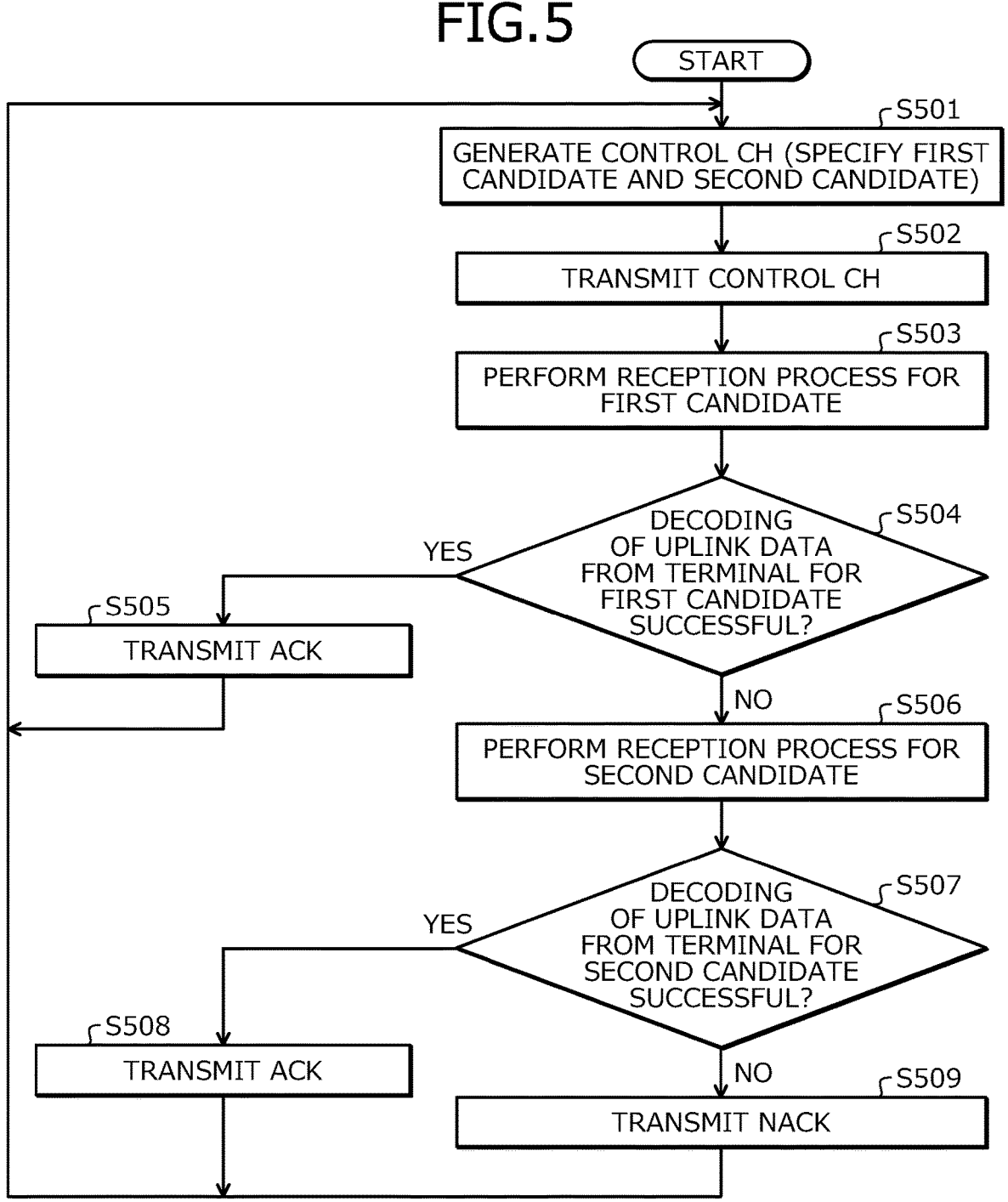

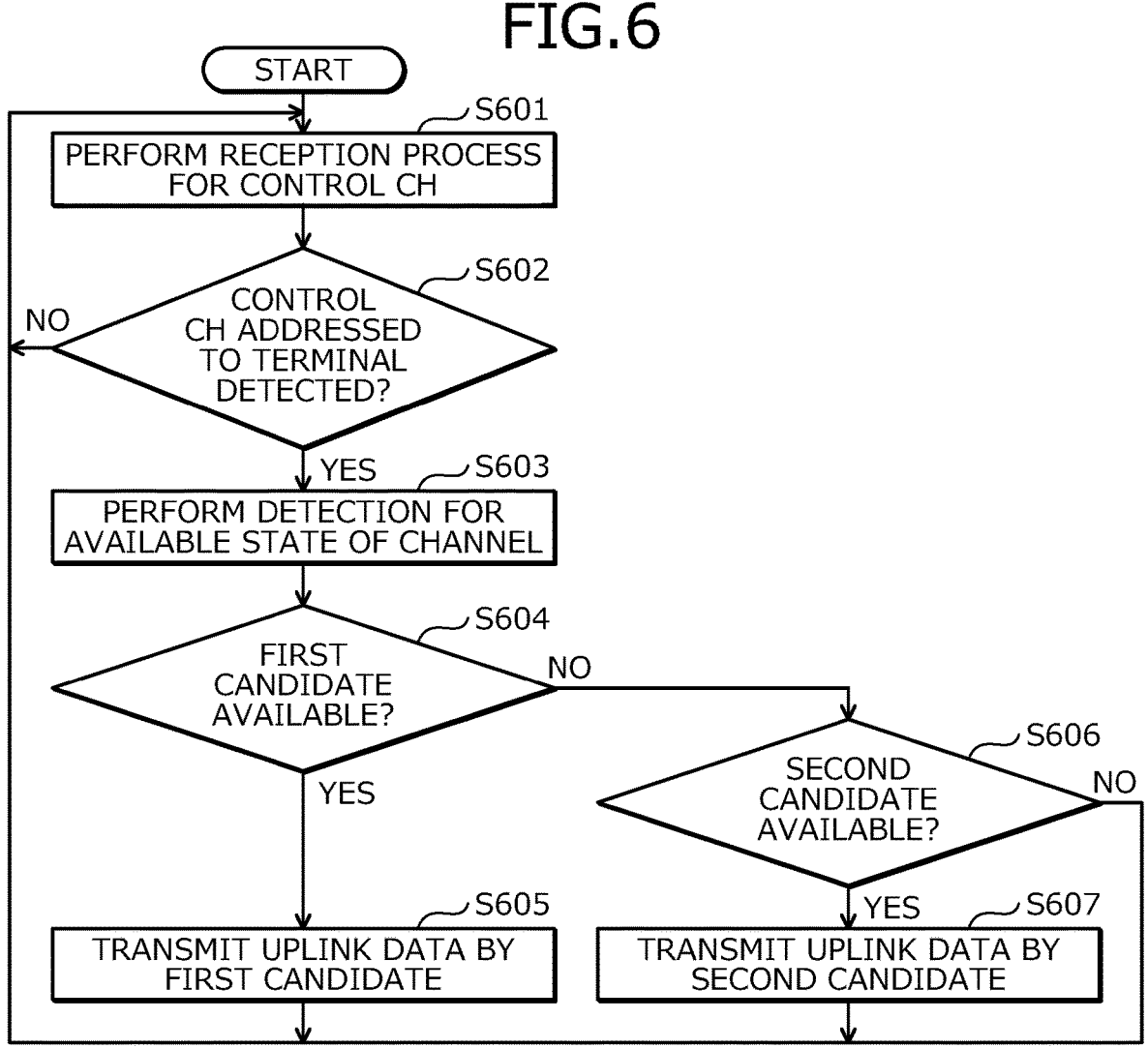

FIG.13

|  | RESOURCE 1 | RESOURCE 2 | RESOURCE 3 | RESOURCE 4 |
|---|---|---|---|---|
| USER 1 | 1 | 2 | 3 | 4 |
| USER 2 | 3 | 4 | 1 | 2 |
| USER 3 | 4 | 3 | 2 | 1 |

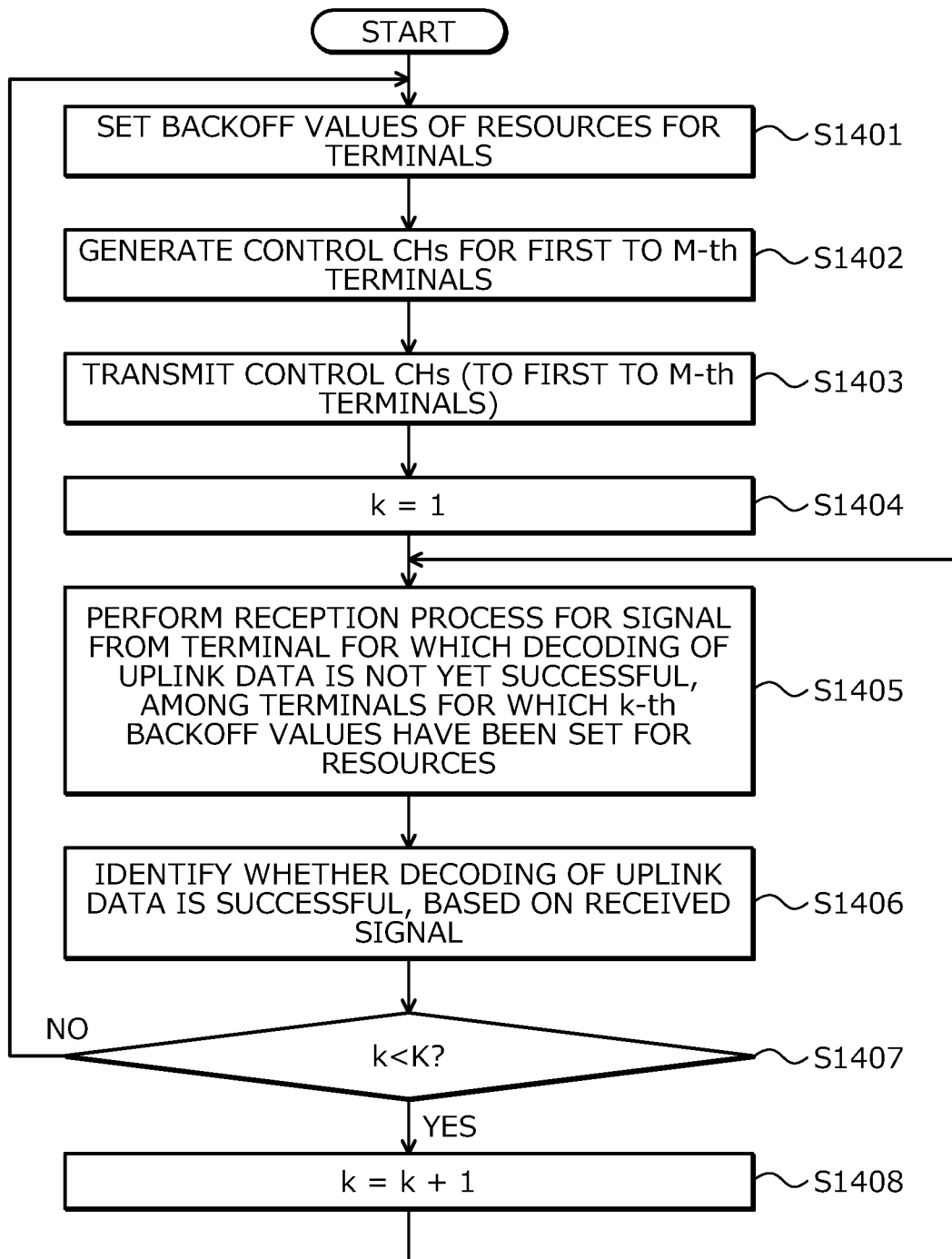

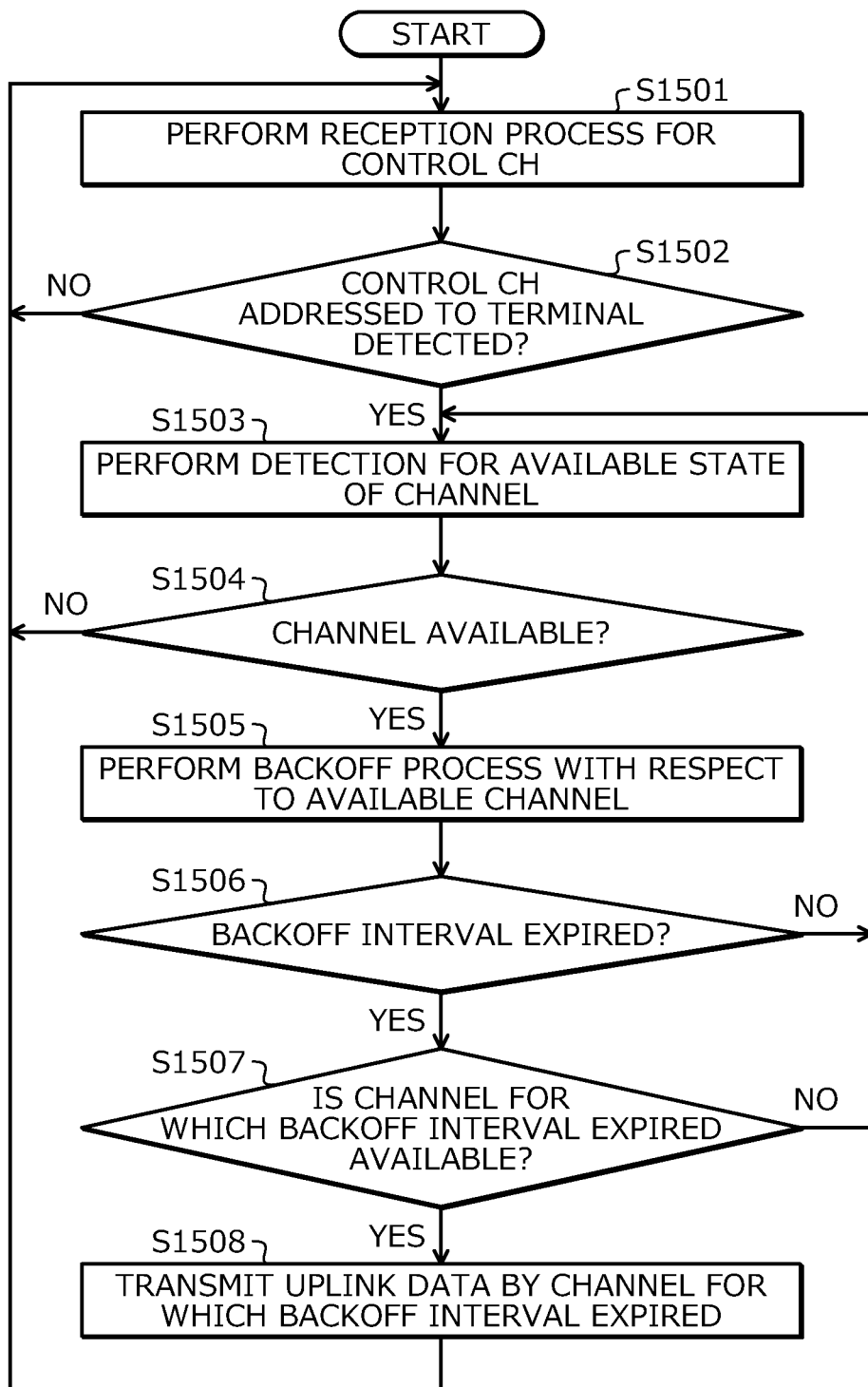

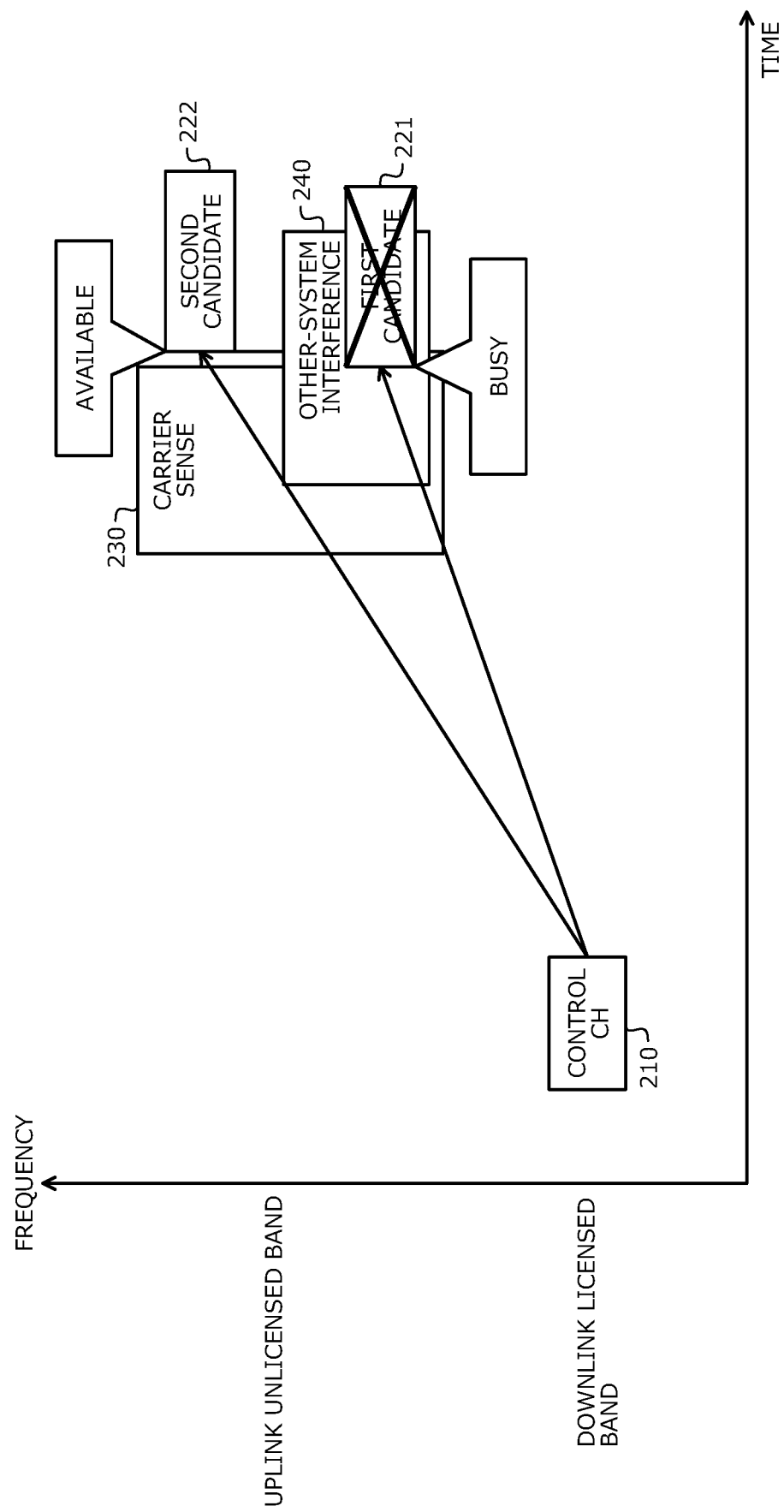

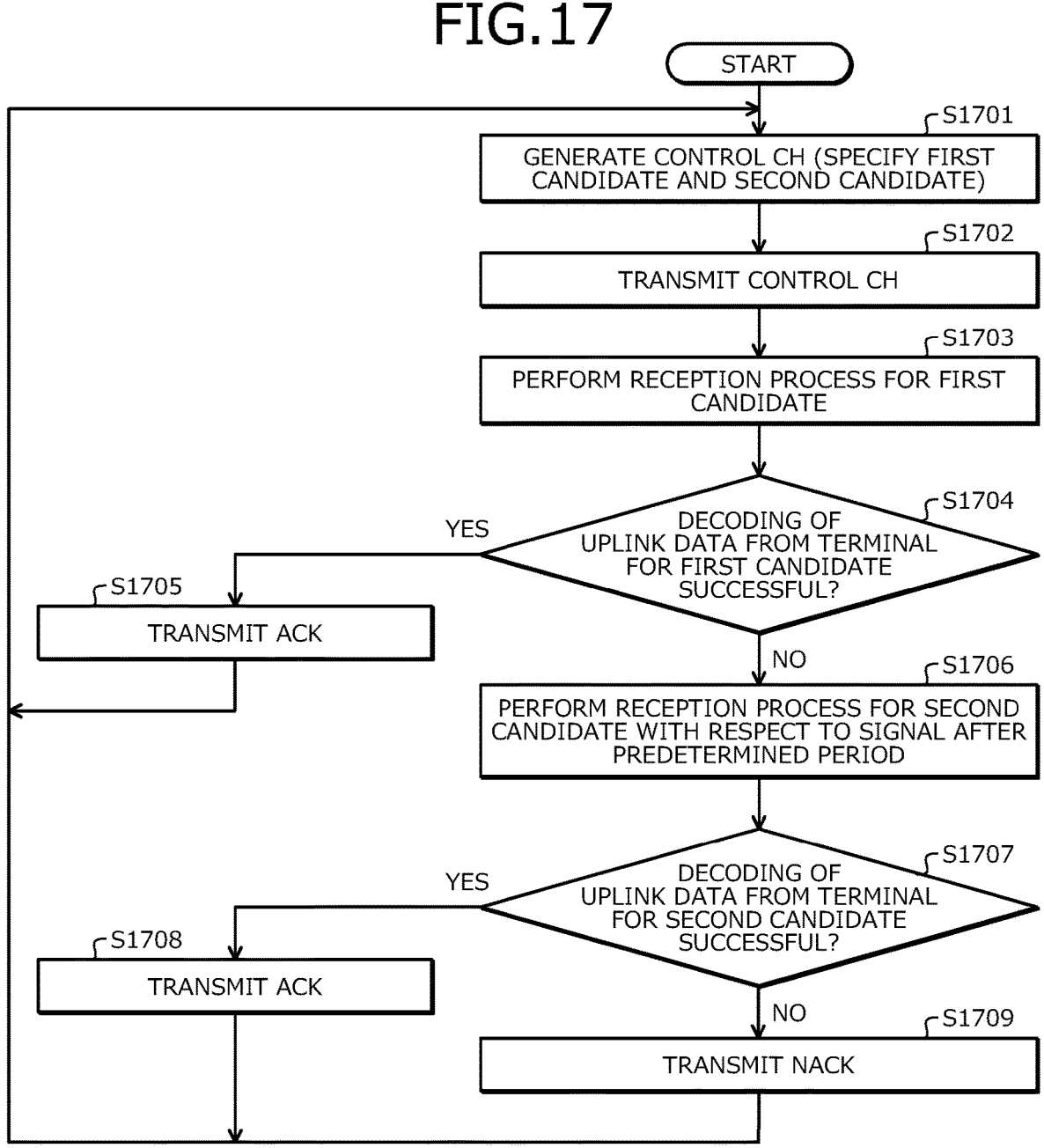

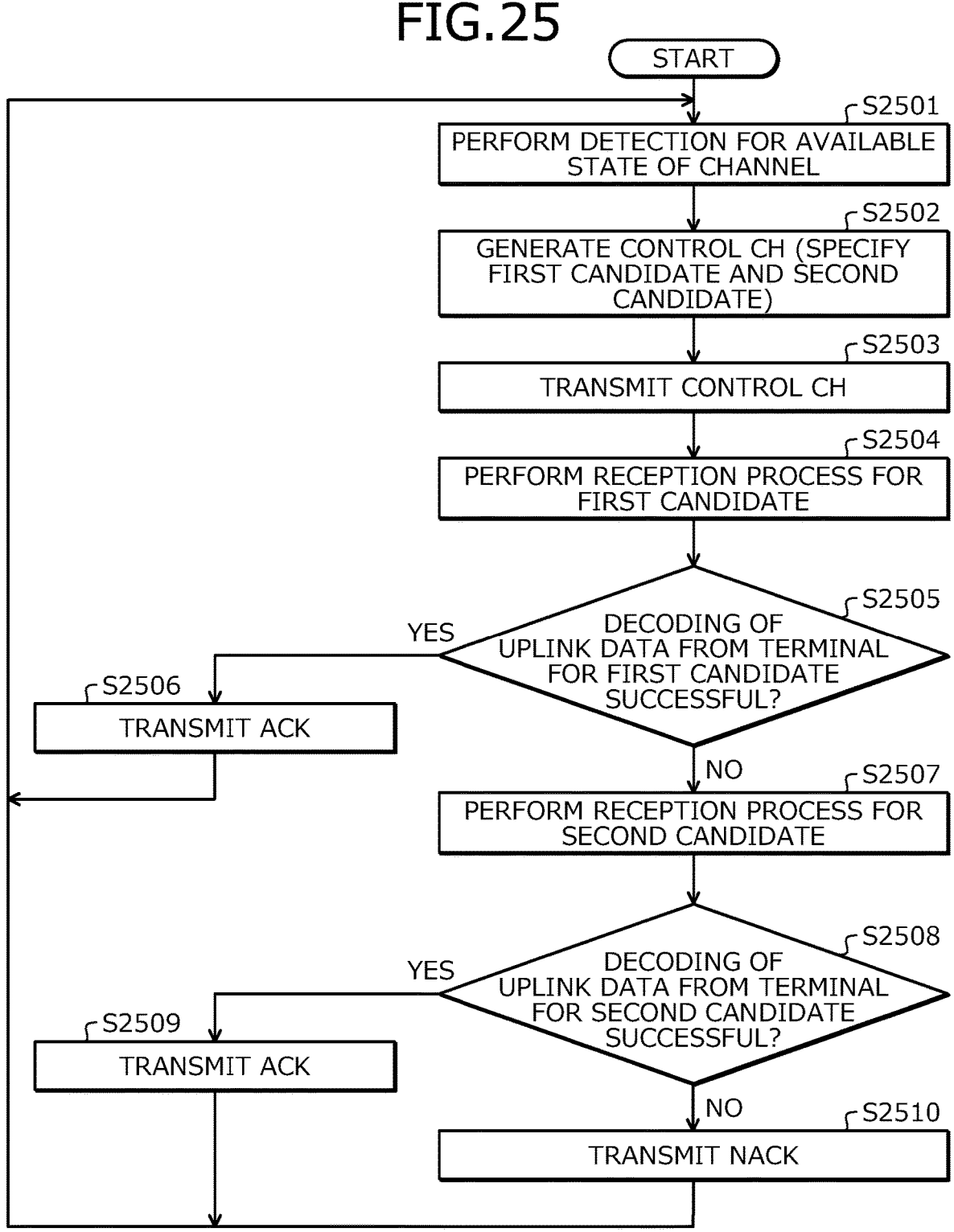

WIRELESS COMMUNICATIONS SYSTEM, COMMUNICATIONS APPARATUS, AND PROCESSING METHOD

CROSS REFERENCE TO RELATED APPLICATIONS

This application is a continuation of U.S. application Ser. No. 15/604,802, filed on May 25, 2017, now pending, which is a continuation application of International Application PCT/JP2014/083793, filed on Dec. 19, 2014, and designating the U.S., the entire contents of each are incorporated herein by reference.

FIELD

The embodiments discussed herein relate to a wireless communications system, a communications apparatus, and a processing method.

BACKGROUND

Mobile communication of Long Term Evolution (LTE), LTE-advanced, and the like is conventionally known. Further, techniques of using shared band such as unlicensed band (Unlicensed band) is being studied (for example, refer to Published Japanese-Translations of PCT Applications, Publication Nos. 2013-523018 and 2008-518541, and Japanese Laid-Open Patent Publication Nos. 2006-203361 and 2007-312078).

SUMMARY

According to an aspect of an embodiment, a wireless communications system includes a first communications apparatus configured to use a predetermined band shared with a second wireless communications system and receive a wireless signal from a second communications apparatus; and the second communications apparatus. The first communications apparatus is further configured to assign to the second communications apparatus, a first candidate and a second candidate for a utilization resource in the predetermined band. The second communications apparatus is configured to perform radio resource idle state detection based on a result of assignment of the first candidate and the second candidate by the first communications apparatus. The second communications apparatus is further configured to use the first candidate and transmit the wireless signal to the first communications apparatus when the first candidate is idle, and to use the second candidate and transmit the wireless signal to the first communications apparatus, when the first candidate is not idle and the second candidate is idle.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1B is a diagram depicting an example of signal flow in the wireless communications system depicted in FIG. 1A;
FIG. 2 is a diagram of an example of uplink communication in the wireless communications system according to the first embodiment;
FIG. 3C is a diagram of an example of hardware configuration of the base station;
FIG. 5 is a flowchart of an example of a process by the base station according to the first embodiment;
FIG. 6 is a flowchart of an example of a process by the terminal according to the first embodiment;
FIG. 13 is a diagram of an example of backoff values of resources set in the terminals;
FIG. 14 is a flowchart of an example of a process by the base station according to the third embodiment;
FIG. 15 is a flowchart of an example of a process by the terminal according to the third embodiment;
FIG. 16B is a diagram (part 2) of an example of uplink communication in the wireless communications system according to the fourth embodiment;
FIG. 17 is a flowchart of an example of a process by the base station according to the fourth embodiment.

FIG. 25 is a flowchart of an example of a process by the base station according to the sixth embodiment.

DESCRIPTION OF THE INVENTION

Embodiments of a wireless communications system, a communications apparatus, and a processing method according to the present invention will be described in detail with reference to the accompanying drawings.

Figure 1A:
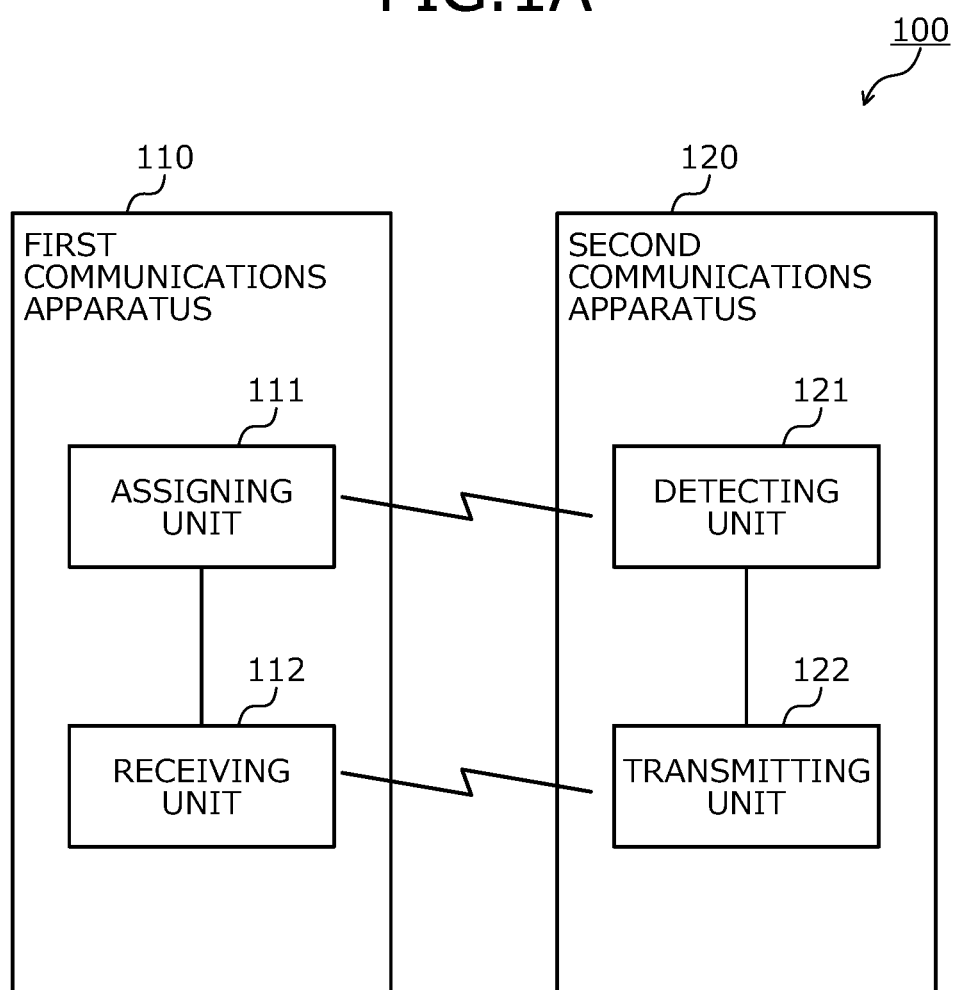
FIG. 1A is a diagram depicting an example of a wireless communications system according to a first embodiment.

FIG. 1A is a diagram depicting an example of the wireless communications system according to a first embodiment. FIG. 1B is a diagram depicting an example of signal flow in the wireless communications system depicted in FIG. 1A. As depicted in FIGS. 1A and 1B, a wireless communications system 100 according to the first embodiment includes a first communications apparatus 110 and a second communications apparatus 120.

A base station and a terminal in cellular communication may be given as examples of the first communications apparatus and the second communications apparatus. Further, a first terminal and a second terminal capable of direct communication between terminals (Device to Device communication) may be given as another example of the first communications apparatus and the second communications apparatus. In the present embodiment hereinafter, an example of a case in which the first communications apparatus 110 is a base station (hereinafter, "base station 110") and the second communications apparatus 120 is a terminal (hereinafter, "terminal 120") will be described.

In the wireless communications system 100, a wireless signal is transmitted from the terminal 120 to the base station 110, using a predetermined band shared by the wireless communications system 100 and another wireless communications system. For example, in the wireless communications system 100, wireless communication by LTE, LTE-A, or the like is performed.

The predetermined band is, for example, an unlicensed band (non-licensed band). The unlicensed band is, for example, an Industry-Science-Medical (ISM) band (2.4 [GHz] band), a 5 [GHz] band, or the like. The other wireless communications system is, for example, a wireless communications system of a wireless local area network (WLAN). Further, the communications system may be a wireless communications system of LTE, LTE-A, or the like, different from the wireless communications system 100.

The base station 110 is a first communications apparatus including an assigning unit 111 and a receiving unit 112. The assigning unit 111 assigns to the terminal 120, a first candidate and a second candidate for a utilization resource in the predetermined band. A utilization resource is a radio resource a used in wireless signal transmission from the terminal 120 to the base station 110. The first candidate and the second candidate for the utilization resource are radio resources included in the predetermined band and are radio resources that are different from each other.

A radio resource, for example, is a time resource, a frequency resource, or a combination of a time resource and a frequency resource. For example, the radio resource may be a component carrier (CC), a resource block (RB), or a subframe.

The assigning unit 111 notifies the receiving unit 112 of the result of assignment of the first candidate and the second candidate to the terminal 120. The assigning unit 111 further notifies the terminal 120 of the result of assignment of the first candidate and the second candidate. For example, the assigning unit 111 notifies the terminal 120 of the assignment result of the first candidate and the second candidate by transmitting control information to the terminal 120.

In the transmission of the control information by the assigning unit 111, for example, the wireless communications system 100 may use an exclusive-use band. The exclusive-use band of the wireless communications system 100, for example, is a licensed band assigned to an operator of the wireless communications system 100. Alternatively, an unlicensed band may be used in the transmission of the control information by the assigning unit 111.

For example, a Physical Downlink Control Channel (PDCCH) or an Enhanced-Physical Downlink Control Channel (E-PDCCH) may be used as the control information transmitted by the assigning unit 111.

For example, the control information transmitted by the assigning unit 111 may be information directly indicating the first candidate and the second candidate assigned to the terminal 120. As a result, the assigning unit 111 may flexibly assign the first candidate and the second candidate.

Alternatively, the control information transmitted by the assigning unit 111 may be information indicating the first candidate and a relationship of the first candidate and the second candidate. As a result, increases in the overhead of the control information transmitted by the assigning unit 111 may be suppressed. The relationship of the first candidate and the second candidate may be, for example, a difference between the first candidate and the second candidate. The difference of the first candidate and the second candidate may be, for example, a time difference, a frequency difference, or a time difference and a frequency difference. In this case, the terminal 120 may identify the second candidate based on the first candidate indicated by the received control information and the difference indicated by the received control information.

Alternatively, the relationship of the first candidate and the second candidate may be shared between the base station 110 and the terminal 120. For example, the base station 110 may give notification of the relationship of the first candidate and the second candidate to the terminal 120 whereby the relationship of the first candidate and the second candidate may be shared between the base station 110 and the terminal 120. In the notification of the relationship of the first candidate and the second candidate from the base station 110 to the terminal 120, for example, a control signal such as a Radio Resource Control (RRC) may be used.

In this case, the control information transmitted by the assigning unit 111 may be information indirectly indicating the second candidate by directly indicating the first candidate. As a result, increases in the overhead of the control information transmitted by the assigning unit 111 may be suppressed. The terminal 120 may identify the second candidate based on the first candidate indicated by the received control information and the relationship of the second candidate and the first candidate shared with the base station 110.

The receiving unit 112 performs based on the assignment result of the first candidate and the second candidate notified by the assigning unit 111, a reception process concerning the radio resources of the first candidate and the second candidate assigned to the terminal 120. As a result, irrespective of whether the terminal 120 transmits a wireless signal by the first candidate or the second candidate, the signal transmitted by the terminal 120 may be received.

Further, the receiving unit 112 may first perform the reception process for the first candidate and only when the wireless signal from the terminal 120 cannot be received by the reception process for the first candidate, may perform the reception process for the second candidate. As a result, the reception process may be performed efficiently at the receiving unit 112. In this case, for example, the receiving unit 112 buffers the received signal with respect to the second candidate and when the wireless signal from the terminal 120 cannot be received by the reception process for the first candidate, the receiving unit 112 performs a reception process of decoding or the like with respect to the buffered received signal of the second candidate.

Alternatively, configuration may be such that the assigning unit 111 sets the second candidate to a radio resource temporally following the first candidate. As a result, when the wireless signal from the terminal 120 cannot be received by the reception process for the first candidate, the receiving unit 112 may perform the reception process for the second candidate without buffering the received signal concerning the second candidate.

Further, the receiving unit 112, for example, performs with respect to the received wireless signal, decoding and demodulation based on an encoding and modulating scheme specified by the terminal 120 and when successful in decoding, the receiving unit 112 may determine that the wireless signal has been received from the terminal 120. In this case, for example, Cyclic Redundancy Check (CRC) or the like may be used for decoding.

The terminal 120 is the second communications apparatus including a detecting unit 121 and a transmitting unit 122. The detecting unit 121 performs radio resource idle state detection, based on the result of assignment of the first candidate and the second candidate for a utilization resource in the predetermined band, the first candidate and the second candidate being assigned to the terminal 120 and notified by the base station 110. For example, the detecting unit 121 receives the control information transmitted from the base station 110 and may thereby identify the first candidate and the second candidate.

Further, the detecting unit 121, for example, may detect an idle state of the first candidate and the second candidate. Alternatively, the detecting unit 121 may first perform detection for the idle state of the first candidate and only when the first candidate is not idle, the detecting unit 121 may perform detection for the idle state of the second candidate. The detecting unit 121 notifies the transmitting unit 122 of a detection result.

The transmitting unit 122 uses the first candidate and transmits a wireless signal to the base station 110, when the first candidate is idle based on the detection result notified by the detecting unit 121. Further, the transmitting unit 122 uses the second candidate and transmits a wireless signal to the base station 110, when the first candidate is not idle and the second candidate is idle. Further, when neither the first candidate nor the second candidate is idle, for example, the transmitting unit 122 does not transmit a wireless signal to the base station 110.

Further, when the first candidate and the second candidate are idle, the transmitting unit 122, for example, uses only the first candidate and transmits a wireless signal to the base station 110. Alternatively, when the first candidate and the second candidate are idle, the transmitting unit 122 may use both the first candidate and the second candidate, and transmit a wireless signal to the base station 110.

In this manner, according to the wireless communications system 100, the base station 110 may assign to the terminal 120, plural candidate radio resources of a predetermined band shared with another wireless communications system.

Further, the terminal 120 performs radio resource idle state detection and is able to transmit an uplink signal by an idle radio resource among the plural candidates assigned by the base station 110. As a result, in the predetermined band shared with another wireless communications system, the success rate of wireless signal transmission from the terminal 120 to the base station 110 may be increased, enabling throughput to be enhanced.

In the example depicted in FIGS. 1A and 1B, although a case has been described in which the base station 110 assigns to the terminal 120, a first candidate and a second candidate for a utilization resource, the base station 110 may assign three or more candidates for a utilization resource to the terminal 120. For example, the terminal 120 uses a third candidate to transmit a wireless signal to the base station 110, when the first candidate and the second candidate are not idle but the third candidate is idle.

In the example depicted in FIGS. 1A and 1B, although an operation example has been described for a case in which the first communications apparatus 110 and the second communications apparatus 120 are respectively the base station 110 and the terminal 120 in cellular communication, when the first communications apparatus 110 and the second communications apparatus 120 are respectively a first terminal and a second terminal in direct communication between terminals, the assigning unit 111 may have a function of notifying (transferring to) the second terminal of information concerning the radio resources assigned by a non-depicted higher apparatus (for example, a base station in cellular communication).

FIG. 2 is a diagram of an example of uplink communication in the wireless communications system according to the first embodiment. In FIG. 2, the horizontal axis represents time and the vertical axis represents frequency. A downlink licensed band on the vertical axis is a band used in wireless transmission from the base station 110 to the terminal 120, in a licensed band. An uplink unlicensed band on the vertical axis is a band used in wireless transmission from the terminal 120 to the base station 110, in an unlicensed band.

A control CH 210 is a control CH (control channel) transmitted by the base station 110 to the terminal 120 by the downlink licensed band. The control CH 210 includes information assigning a first candidate 221 and a second candidate 222 for a utilization resource for uplink data transmission from the terminal 120 to the base station 110. The first candidate 221 and the second candidate 222 are each bands included in the uplink unlicensed band. The first candidate 221 is a utilization resource having a priority level higher than that of the second candidate 222. For example, a PDCCH, an E-PDCCH, etc. may be used as the control CH 210.

The terminal 120, based on the received control CH 210, performs a carrier sense (CS) 230 for a band that includes the first candidate 221 and the second candidate 222. In the example depicted in FIG. 2, the terminal 120 performs the carrier sense 230 for the entire uplink unlicensed band, immediately before a time region of the first candidate 221 and the second candidate 222.

Further, in the example depicted in FIG. 2, the terminal 120 is assumed to determine from the result of the carrier sense 230, that the first candidate 221 is busy (Busy) from other-system interference 240 and the second candidate 222 is idle (Idle (idle state)). The other-system interference 240 is interference at the wireless communications system 100 from a wireless signal transmitted from a wireless communications system other than the wireless communications system 100. In this case, the terminal 120 transmits uplink data to the base station 110 by the second candidate 222 without transmitting the uplink data to the base station 110 by the first candidate 221.

Further, as an example different from the example depicted in FIG. 2, the terminal 120, when determining that the first candidate 221 is idle and the second candidate 222 is busy, transmits the uplink data to the base station 110 by the first candidate 221. Further, the terminal 120, when determining that the first candidate 221 and the second candidate 222 are both idle, transmits the uplink data to the base station 110 by the first candidate 221 having a priority level higher than that of the second candidate 222. Further, when determining that both the first candidate 221 and the second candidate 222 are busy, the terminal 120 does not transmit the uplink data to the base station 110.

In the example depicted in FIG. 2, although a case is described in which the licensed band is used in the transmission of the control CH 210 from the base station 110 to the terminal 120, the unlicensed band may be used in the transmission of the control CH 210.

Figure 3A:
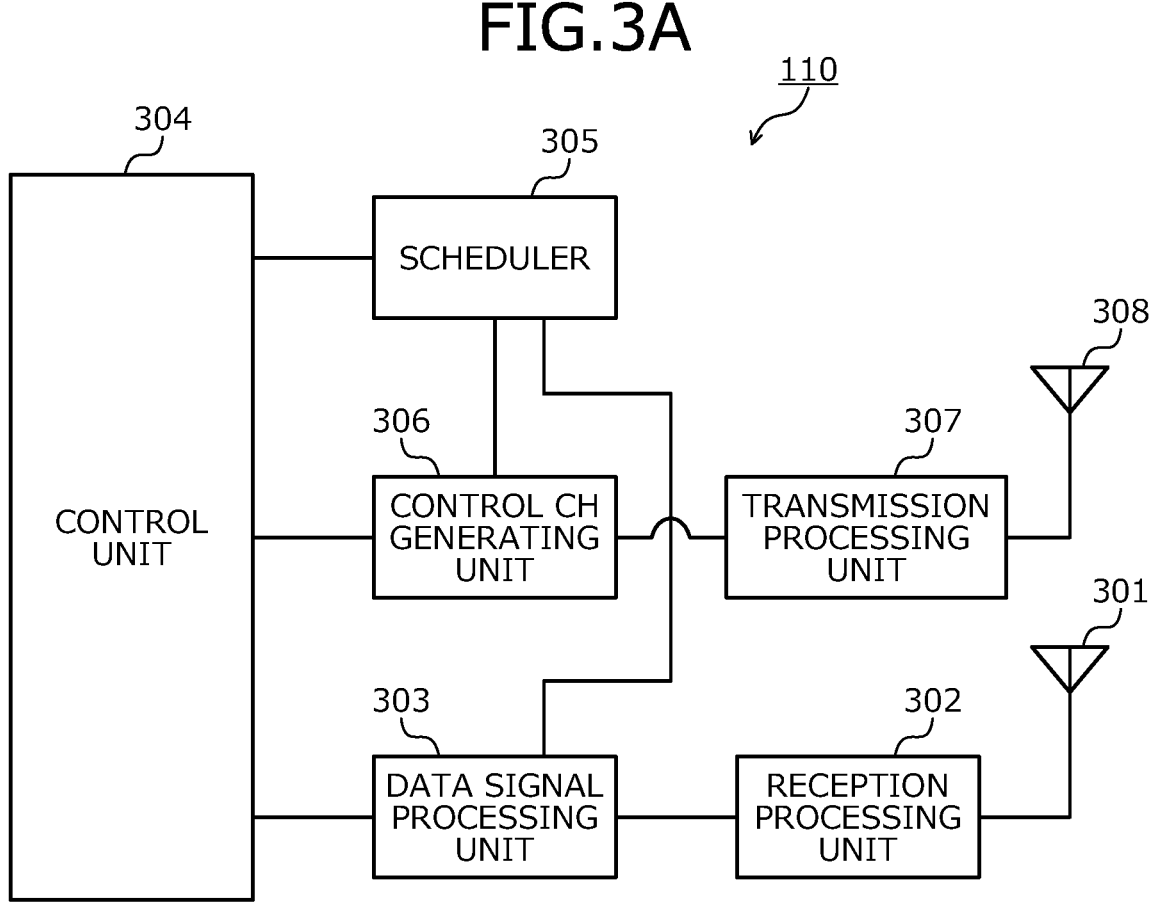
FIG. 3A is a diagram of an example of a base station.
Figure 3B:
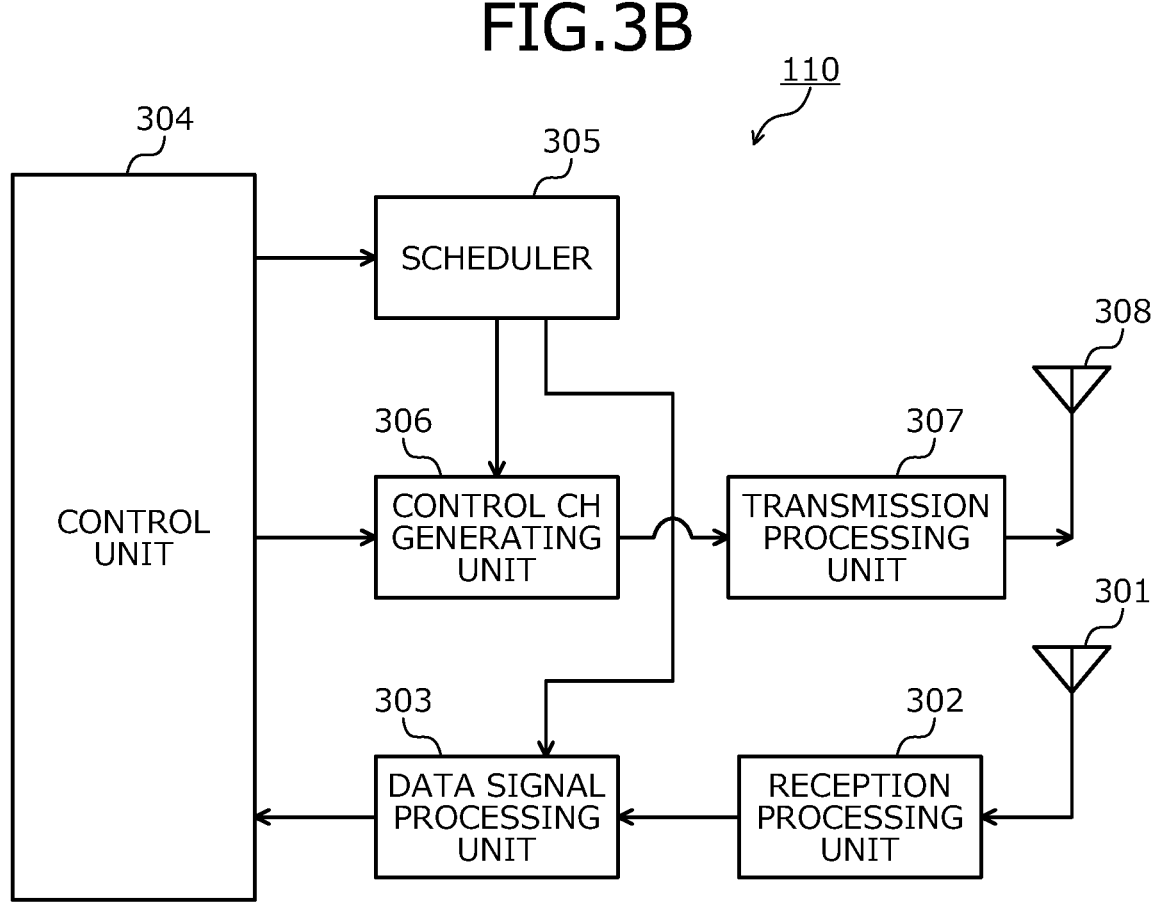
FIG. 3B is a diagram of signal flow in the base station depicted in FIG. 3A.

FIG. 3A is a diagram of an example of the base station. FIG. 3B is a diagram of signal flow in the base station depicted in FIG. 3A. As depicted in FIGS. 3A and 3B, the base station 110, for example, includes an antenna 301, a reception processing unit 302, a data signal processing unit 303, a control unit 304, a scheduler 305, a control CH generating unit 306, a transmission processing unit 307, and an antenna 308.

The antenna 301 receives a signal wirelessly transmitted from a terminal (for example, the terminal 120) and outputs the received signal to the reception processing unit 302. The reception processing unit 302 performs a reception process for the signal output from the antenna 301. The reception process by the reception processing unit 302, for example, includes amplification, frequency conversion from a high frequency band (Radio Frequency (RF)) to a baseband, conversion from an analog signal to a digital signal, and the like. The reception processing unit 302 outputs the signal subjected to the reception process to the data signal processing unit 303.

The data signal processing unit 303, based on an uplink scheduling result output from the scheduler 305, performs a data signal process for the signal output from the reception processing unit 302. The data signal process by the data signal processing unit 303, for example, includes demodulation and decoding. For example, the data signal processing unit 303 performs a data signal process of attempting decoding with respect to the candidates for a utilization resource of the unlicensed band assigned to one terminal for uplink. The data signal processing unit 303 outputs data obtained by the data signal process to the control unit 304.

The control unit 304 performs various types of control concerning communication by the base station 110. For example, the control unit 304 controls the scheduler 305 and the control CH generating unit 306. The control of the scheduler 305 and the control CH generating unit 306 by the control unit 304, for example, maybe performed based on control information included in the data output from the data signal processing unit 303.

The scheduler 305, under the control of the control unit 304, performs scheduling of downlinks from the base station 110 to a terminal (for example, the terminal 120) and scheduling of uplinks from a terminal (for example, the terminal 120) to the base station 110. The scheduling of uplinks by the scheduler 305 includes scheduling of assigning plural candidates for a utilization resource of the unlicensed band to one terminal. The scheduler 305 outputs scheduling results for downlinks and uplinks to the control CH generating unit 306. Further, the scheduler 305 outputs the uplink scheduling result to the data signal processing unit 303.

The control CH generating unit 306, based on control from the control unit 304 and the scheduling result output from the scheduler 305, generates a downlink control CH. The control CH generated by the control CH generating unit 306 includes information assigning the candidates assigned to the terminal, for a utilization resource in the unlicensed band. The control CH generating unit 306 outputs the generated control CH to the transmission processing unit 307.

The transmission processing unit 307 performs a transmission process for the control CH output from the control CH generating unit 306. The transmission process by the transmission processing unit 307, for example, includes conversion from a digital signal to an analog signal, frequency conversion from a baseband to an RF band, amplification, and the like. The transmission processing unit 307 outputs a signal subjected to the transmission process to the antenna 308. The antenna 308 wirelessly transmits to a terminal (for example, the terminal 120), the signal output from the transmission processing unit 307.

The assigning unit 111 of the base station 110 depicted in FIGS. 1A and 1B, for example, may be realized by the scheduler 305, the control CH generating unit 306, the transmission processing unit 307, and the antenna 308. The receiving unit 112 of the base station 110 depicted in FIGS. 1A and 1B, for example, may be realized by the antenna 301, the reception processing unit 302, and the data signal processing unit 303.

FIG. 3C is a diagram of an example of hardware configuration of the base station. The base station 110 depicted in FIGS. 3A and 3B, for example, may be realized by a communications apparatus 330 depicted in FIG. 3C. The communications apparatus 330 includes a CPU 331, a memory 332, a wireless communications interface 333, and a wired communications interface 334. The CPU 331, the memory 332, the wireless communications interface 333, and the wired communications interface 334 are connected by a bus 339.

The CPU (central processing unit) 331 governs overall control of the communications apparatus 330. The memory 332, for example, includes main memory and auxiliary memory. The main memory, for example, is random access memory (RAM). The main memory is used as a work area of the CPU 331. The auxiliary memory, for example, is non-volatile memory such as a magnetic disk, an optical disk, flash memory, and the like. The auxiliary memory stores various programs causing the communications apparatus 330 to operate. The programs stored in the auxiliary memory are loaded onto the main memory and are executed by the CPU 331.

The wireless communications interface 333 is a communications interface that performs wireless communication with external apparatuses (for example, the terminal 120) of the communications apparatus 330. The wireless communications interface 333 is controlled by the CPU 331.

The wired communications interface 334 is a communications interface that performs wired communication with an external apparatus (for example, a higher-layer core network of the base station 110) of the communications apparatus 330. The wired communications interface 334 is controlled by the CPU 331.

The antenna 301, the reception processing unit 302, the transmission processing unit 307, and the antenna 308 depicted in FIGS. 3A and 3B, for example, may be realized by the wireless communications interface 333. The data signal processing unit 303, the control unit 304, the scheduler 305, and the control CH generating unit 306 depicted in FIGS. 3A and 3B, for example, may be realized by the CPU 331.

Figure 4A:
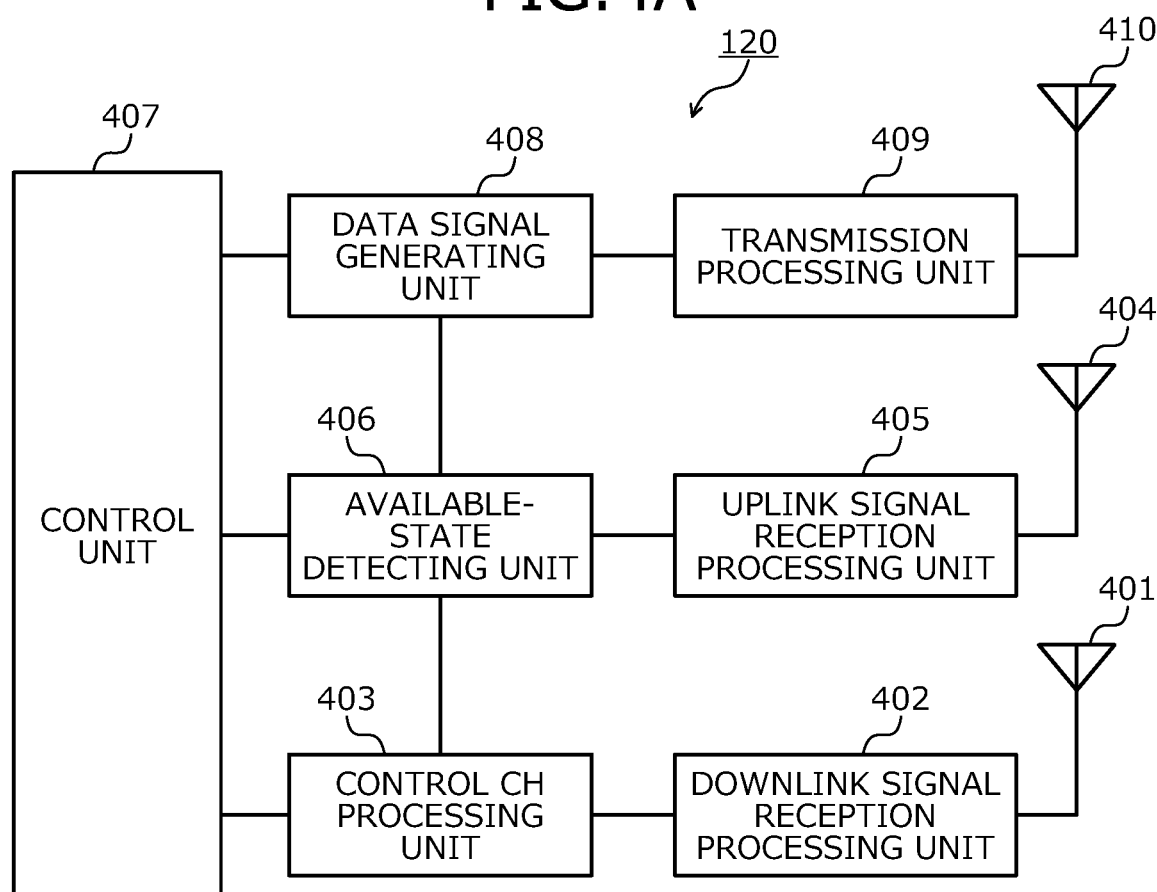
FIG. 4A is a diagram of an example of a terminal.
Figure 4B:
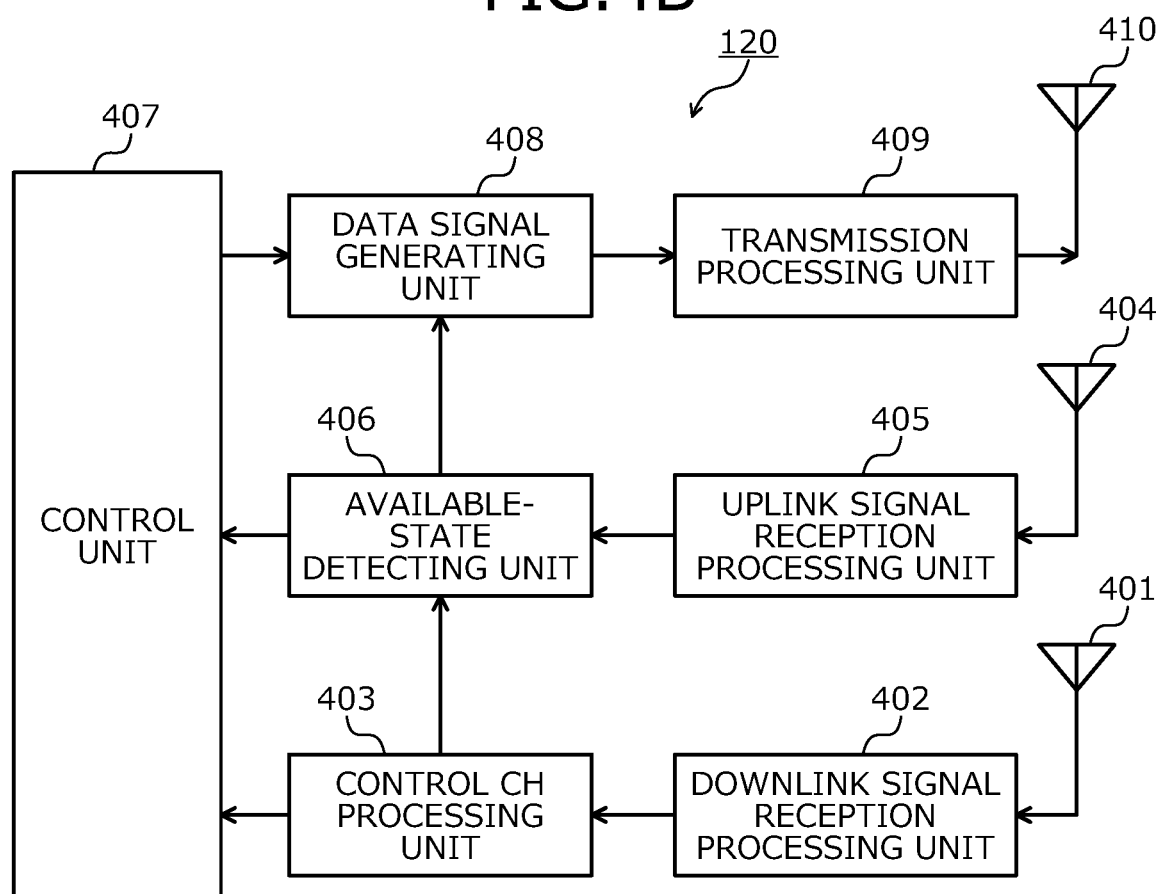
FIG. 4B is a diagram of an example of signal flow in the terminal depicted in FIG. 4A.

FIG. 4A is a diagram of an example of the terminal. FIG. 4B is a diagram of an example of signal flow in the terminal depicted in FIG. 4A. As depicted in FIGS. 4A and 4B, the terminal 120, for example, includes an antenna 401, a downlink signal reception processing unit 402, a control CH processing unit 403, an antenna 404, an uplink signal reception processing unit 405, and an idle-state detecting unit 406. Further, the terminal 120 includes a control unit 407, a data signal generating unit 408, a transmission processing unit 409, and an antenna 410.

The antenna 401 receives a signal wirelessly transmitted from another communications apparatus (for example, the base station 110) and outputs the received signal to the downlink signal reception processing unit 402. The downlink signal reception processing unit 402 performs a reception process for a downlink signal from the base station 110, the downlink signal being included in the signal output from the antenna 401. The reception process by the downlink signal reception processing unit 402, for example, includes amplification, frequency conversion from an RF band to a baseband, conversion from an analog signal to a digital signal, and the like. The downlink signal reception processing unit 402 outputs the downlink signal subjected to the reception process to the control CH processing unit 403.

The control CH processing unit 403 performs a process for the control CH included in the downlink signal output from the downlink signal reception processing unit 402. The process for the control CH by the control CH processing unit 403, for example, includes demodulation and decoding of the control CH. The control CH processing unit 403 outputs the control CH obtained by the process for the control CH to the control unit 407.

Further, the control CH processing unit 403 outputs to the idle-state detecting unit 406, information indicating the candidates for a utilization resource (in the unlicensed band) assigned to uplink transmission of the terminal 120, the information being included in the control CH obtained by the process for the control CH.

The antenna 404 receives a signal wirelessly transmitted from another communications apparatus (for example, another terminal) and outputs the received signal to the uplink signal reception processing unit 405. The uplink signal reception processing unit 405 performs a reception process for an uplink signal included in the signal output from the antenna 404. The reception process by the uplink signal reception processing unit 405, for example, includes amplification, frequency conversion from an RF band to a baseband, conversion from an analog signal to a digital signal, and the like. The uplink signal reception processing unit 405 outputs the uplink signal subjected to the reception process to the idle-state detecting unit 406.

The idle-state detecting unit 406, based on the uplink signal output from the uplink signal reception processing unit 405, performs a carrier sense of detecting an idle state of an uplink band. Further, the idle-state detecting unit 406, based on the information output from the control CH processing unit 403, detects an idle state with respect to a target band that includes the candidates assigned to uplink transmission of the terminal 120, for a utilization resource of the unlicensed band. The idle-state detecting unit 406 outputs to the control unit 407 and the data signal generating unit 408, a detection result for the idle state in the uplink band.

For example, the idle-state detecting unit 406 detects a wireless signal in the target band. Detection of a wireless signal in the target band, for example, is a process of detecting a wireless signal by detecting the reception power (reception energy) of an electromagnetic wave in the target band and comparing the detected reception power and a predetermined power. Alternatively, the detection of a wireless signal in the target band may be a process of detecting a wireless signal by detecting a predetermined pattern of a wireless signal (for example, preamble), based on an electromagnetic wave in the target band.

For example, in the detection by the idle-state detecting unit 406, a carrier sense of Carrier Sense Multiple Access/ Collision Avoidance (CSMA/CA) may be used.

The control unit 407 performs various types of control related to communication by the terminal 120. For example, the control unit 407 controls the data signal generating unit 408. Control of the data signal generating unit 408 by the control unit 407, for example, may be performed based on the control CH output from the control CH processing unit 403, the detection result output from the idle-state detecting unit 406 to the control unit 407, etc.

The data signal generating unit 408 generates an uplink data signal based on control from the control unit 407 and the detection result output from the idle-state detecting unit 406. For example, the data signal generating unit 408 generates an uplink data signal so that for uplink transmission by the unlicensed band, transmission is by the candidate determined to be idle by the idle-state detecting unit 406, among the candidates for a utilization resource assigned to uplink transmission of the terminal 120. The data signal generating unit 408 outputs the generated data signal to the transmission processing unit 409.

The transmission processing unit 409 performs a transmission process for the data signal output from the data signal generating unit 408. The transmission process by the transmission processing unit 409, for example, includes conversion from a digital signal to an analog signal, frequency conversion from a baseband to a RF band, amplification, and the like. The transmission processing unit 409 outputs the signal subjected to the transmission process to the antenna 410. The antenna 410 wirelessly transmits to a base station (for example, the base station 110), the signal output from the transmission processing unit 409.

The detecting unit 121 of the terminal 120 depicted in FIGS. 1A and 1B, for example, may be realized by the antenna 401, the downlink signal reception processing unit 402, the control CH processing unit 403, the antenna 404, the uplink signal reception processing unit 405, and the idle-state detecting unit 406. The transmitting unit 122 of the terminal 120 depicted in FIGS. 1A and 1B, for example, may be realized by the data signal generating unit 408, the transmission processing unit 409, and the antenna 410.

Figure 4C:
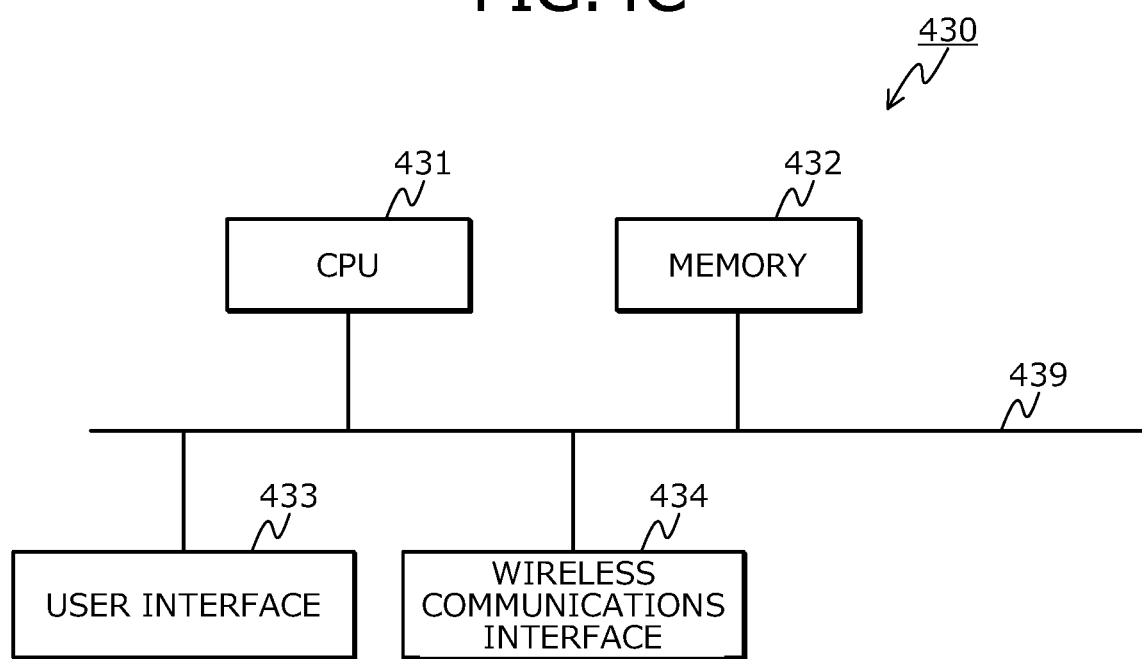
FIG. 4C is a diagram of an example of hardware configuration of the terminal.

FIG. 4C is a diagram of an example of hardware configuration of the terminal. The terminal 120 depicted in FIGS. 4A and 4B, for example, may be realized by a communications apparatus 430 depicted in FIG. 4C. The communications apparatus 430 includes a CPU 431, a memory 432, a user interface 433, and a wireless communications interface 434. The CPU 431, the memory 432, the user interface 433, and the wireless communications interface 434 are connected by a bus 439.

The CPU 431 governs overall control of the communications apparatus 430. The memory 432, for example, includes main memory and auxiliary memory. The main memory, for example, is RAM. The main memory is used as a work area of the CPU 43. The auxiliary memory, for example, is non-volatile memory such as a magnetic disk, flash memory, and the like. The auxiliary memory stores various types of programs that cause the communications apparatus 430 to operate. The programs stored in the auxiliary memory are loaded onto the main memory and are executed by the CPU 431.

The user interface 433, for example, includes an input device that receives operational input from a user, an output device that outputs information to the user, and the like. The input device, for example, may be realized by keys (for example, a keyboard), a remote controller, or the like. The output device, for example, may be realized by a display, a speaker, or the like. Further, the input device and the output device may be realized by a touch panel or the like. The user interface 433 is controlled by the CPU 431.

The wireless communications interface 434 is a communications interface that performs wireless communication with an external apparatus (for example, the base station 110 or another terminal) of the communications apparatus 430. The wireless communications interface 434 is controlled by the CPU 431.

The antenna 401, the downlink signal reception processing unit 402, the antenna 404, the uplink signal reception processing unit 405, the transmission processing unit 409, and the antenna 410 depicted in FIGS. 4A and 4B, for example, may be realized by the wireless communications interface 434. The control CH processing unit 403, the idle-state detecting unit 406, the control unit 407, and the data signal generating unit 408 depicted in FIGS. 4A and 4B, for example, may be realized by the CPU 431.

FIG. 5 is a flowchart of an example of a process by the base station according to the first embodiment. The base station 110 according to the first embodiment, for example, executes the steps depicted in FIG. 5. First, the base station 110 generates a control CH based on a scheduling result concerning the terminal 120 (step S501). The control CH generated at step S501 is a control CH that assigns a first candidate and a second candidate for a utilization resource for transmitting uplink data from the terminal 120 to the base station 110.

The base station 110 transmits the control CH generated at step S501 to the terminal 120 (step S502). Next, the base station 110 performs a reception process for the first candidate assigned by the control CH transmitted at step S502 (step S503). For example, the base station 110 attempts wireless signal decoding for a radio resource corresponding to the first candidate. The base station 110 determines whether in the reception process at step S503, decoding of uplink data from the terminal 120 for the first candidate is successful (step S504).

At step S504, if the decoding is successful (step S504: YES), the base station 110 transmits an ACK (acknowledgement) to the terminal 120 (step S505), and returns to step S501. If the decoding is not successful (step S504: NO), the base station 110 performs a reception process for the second candidate assigned by the control CH transmitted at step S502 (step S506). For example, the base station 110 attempts wireless signal decoding for the radio resource corresponding to the second candidate.

The base station 110 determines whether in the reception process at step S506, decoding of uplink data from the terminal 120 by the second candidate is successful (step S507). If the decoding is successful (step S507: YES), the base station 110 transmits an ACK the terminal 120 (step S508), and returns to step S501. If the decoding is not successful (step S507: NO), the base station 110 transmits a NACK (negative acknowledgement) to the terminal 120 (step S509), and returns to step S501.

Further, after collectively performing a reception process for the first candidate and a reception process for the second candidate, the base station 110 may determine whether decoding of uplink data from the terminal 120 for the first candidate is successful. For example, the base station 110 may perform step S506 between step S503 and step S504. The process may omit transmission of the ACK at steps S505 and S508 and/or the transmission of the NACK at step S509.

FIG. 6 is a flowchart of an example of a process by the terminal according to the first embodiment. The terminal 120 according to the first embodiment, for example, executes the steps depicted in FIG. 6. First, the terminal 120 performs a reception process for a control CH from the base station 110 (step S601). Next, the terminal 120, based on a result of the reception process at step S601, determines whether a control CH addressed to the terminal 120 from the base station 110 has been detected (step S602).

At step S602, if no control CH addressed to the terminal 120 has been detected (step S602: NO), the terminal 120 returns to step S601. If a control CH addressed to the terminal 120 has been detected (step S602: YES), the terminal 120 performs detection for an idle state of a channel, for each utilization resource candidate assigned by the detected control CH addressed to the terminal 120 (step S603).

Next, the terminal 120, based on a result of the detection at step S603, determines whether the first candidate is idle (step S604). If the first candidate is idle (step S604: YES), the terminal 120 transmits uplink data to the base station 110 by the first candidate (step S605), and returns to step S601.

At step S604, if the first candidate is not idle (step S604: NO), the terminal 120, based on the result of the detection at step S603, determines whether the second candidate is idle (step S606). If the second candidate is idle (step S606: YES), the terminal 120 transmits uplink data to the base station 110 by the second candidate (step S607), and returns to step S601. If the second candidate is not idle (step S606: NO), the terminal 120 returns to step S601 without transmitting uplink data to the base station 110.

Figure 7:
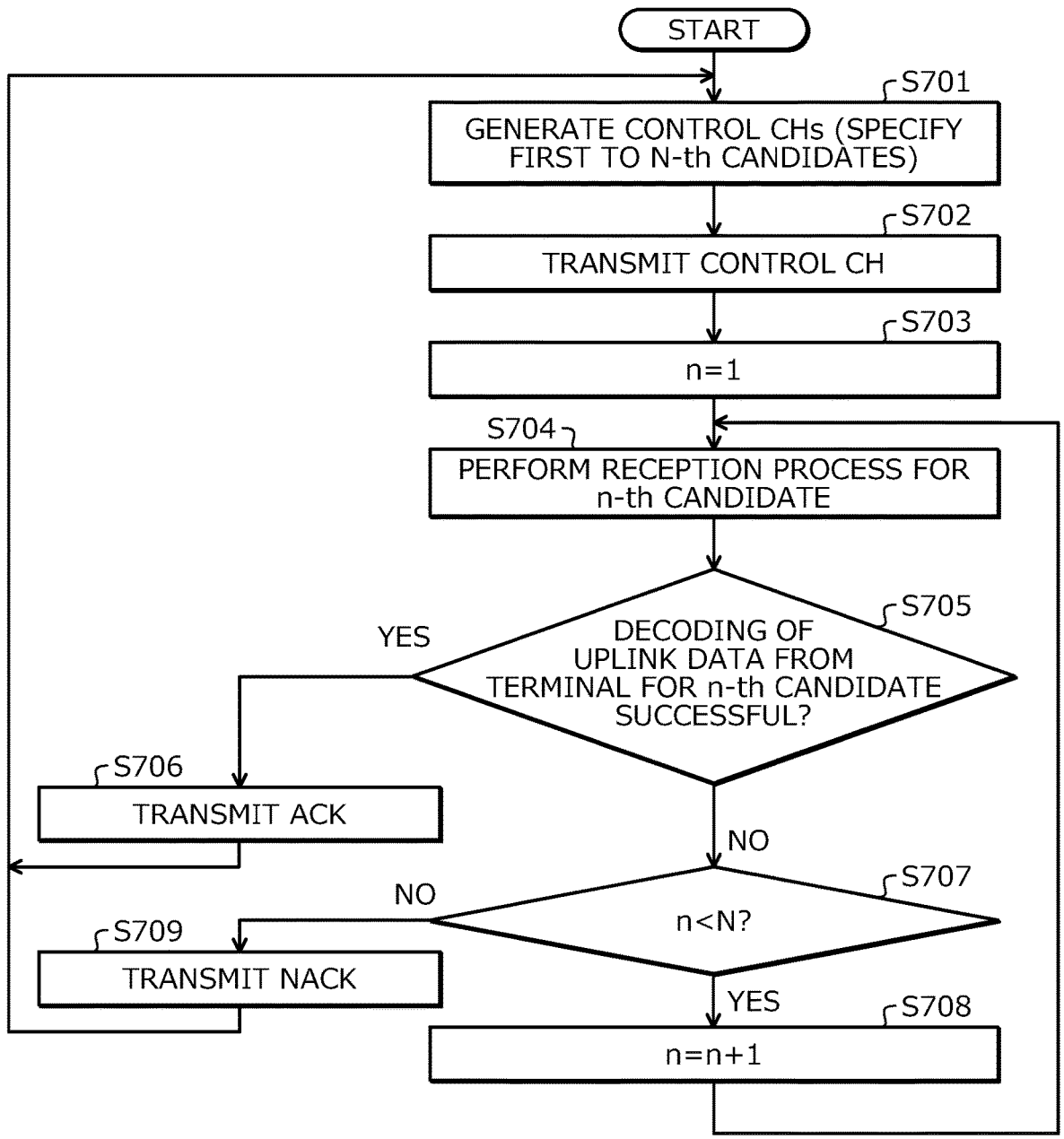
FIG. 7 is a flowchart of a modification example of the process by the base station according to the first embodiment.

FIG. 7 is a flowchart of a modification example of the process by the base station according to the first embodiment. In FIG. 5, although a case is described in which two candidates (a first candidate and a second candidate) for an uplink utilization resource are assigned, in FIG. 7, a case is described in which N candidates for an uplink utilization resource are assigned; N, for example, is an integer of 3 or more.

First, the base station 110 generates a control CH, based on a scheduling result concerning the terminal 120 (step S701). The control CH generated at step S701 is a control CH that assigns first to N-th candidates for a utilization resource for transmitting uplink data from the terminal 120 to the base station 110.

The base station 110 transmits the control CH generated at step S701 to the terminal 120 (step S702). Next, the base station 110 initializes n (n=1) (step S703); n is an index (1 to N) of the candidates for a utilization resource assigned by the control CH transmitted at step S702.

Next, the base station 110 performs a reception process for the n-th candidate assigned by the control CH transmitted at step S702 (step S704). For example, the base station 110 attempts wireless signal decoding for a radio resource corresponding to the n-th candidate. Next, the base station 110 determines whether in the reception process at step S704, decoding of uplink data from the terminal 120 for the n-th candidate is successful (step S705).

At step S705, if the decoding is successful (step S705: YES), the base station 110 transmits an ACK to the terminal 120 (step S706), and returns to step S701. If the decoding is not successful (step S705: NO), the base station 110 determines whether n is less than N (step S707); N is the maximum value of n.

At step S707, if n is less than N (step S707: YES), the base station 110 increments n (n=n+1) (step S708), and returns to step S704. If n is N or greater (step S707: NO), the base station 110 transmits a NACK to the terminal 120 (step S709), and returns to step S701.

Further, the base station 110, after performing reception processes for the first candidate to N-th candidates collectively, may determine sequentially from the first candidate, whether decoding of uplink data from the terminal 120 is successful. The process may omit the transmission of the ACK at step S706 and/or the transmission of the NACK at step S709.

Figure 8:
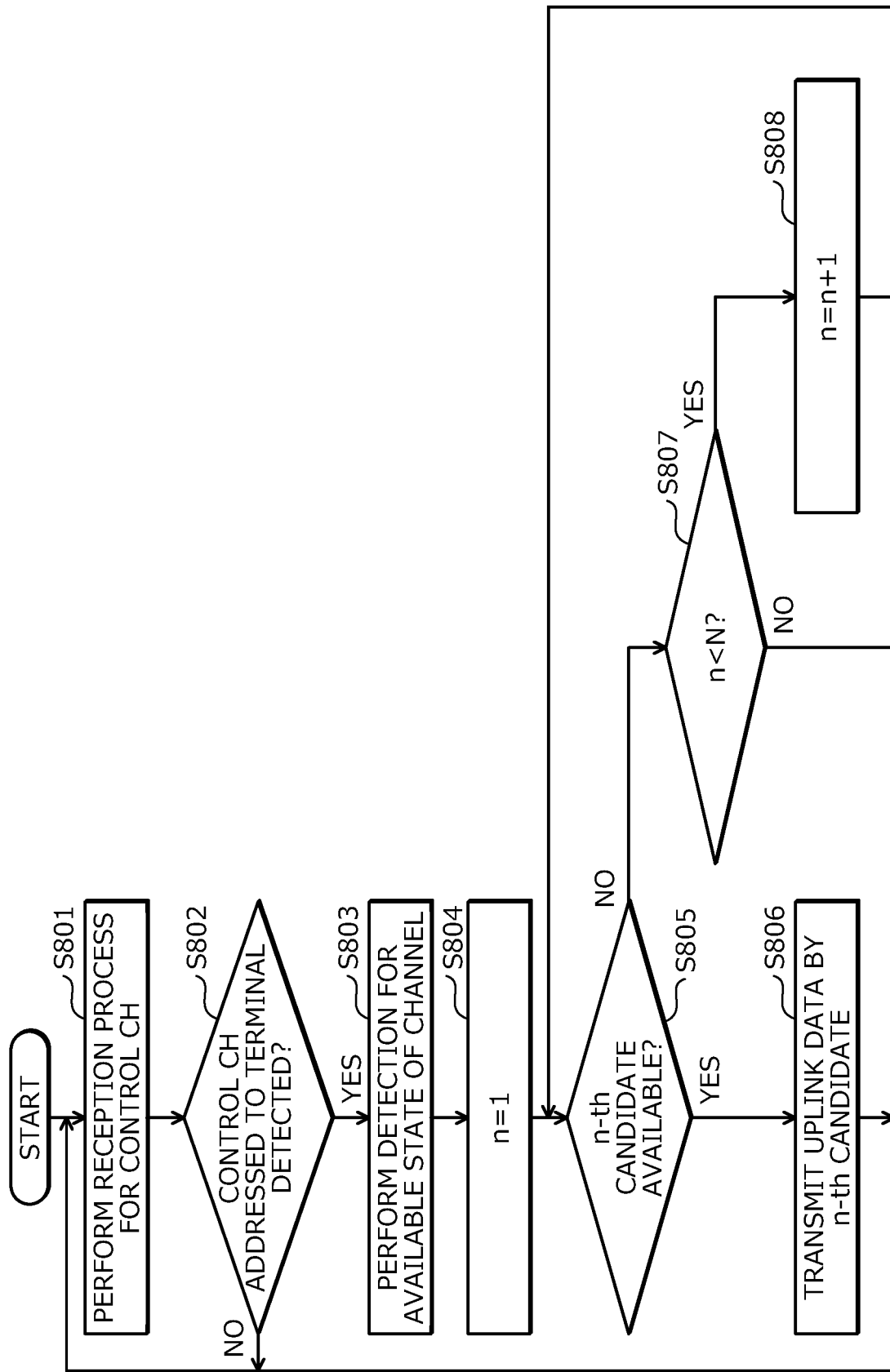
FIG. 8 is a flowchart of a modification example of the process by the terminal according to the first embodiment.

FIG. 8 is a flowchart of a modification example of the process by the terminal according to the first embodiment. In FIG. 6, although a case is described in which two candidates (a first candidate and a second candidate) for an uplink utilization resource are assigned, in FIG. 8, a case is described in which N candidates for an uplink utilization resource are assigned. Steps S801 to S803 depicted in FIG. 8 are identical to steps S601 to S603 depicted in FIG. 6.

After step S803, the terminal 120 initializes n (n=1) (step S804); n is an index (1 to N) of the candidates assigned by the control CH received at step S801. Next, the terminal 120, based on the result of detection at step S803, determines whether the n-th candidate assigned by the control CH received at step S801 is idle (step S805). If the n-th candidate is idle (step S805: YES), the terminal 120 transmits uplink data to the base station 110 by the n-th candidate (step S806), and returns to step S801.

At step S805, if the n-th candidate is not idle (step S805: NO), the terminal 120 determines whether n is less than N (step S807); N is the maximum value of n. If n is less than N (step S807: YES), the terminal 120 increments n (n=n+1) (step S808), and returns to step S805. If n is N or greater (step S807: NO), the terminal 120 returns to step S801 without transmitting uplink data to the base station 110.

Thus, according to the first embodiment, the base station 110 may assign to the terminal 120, plural candidates for a radio resource of the unlicensed band. Further, the terminal 120 may perform a carrier sense based on the assignment result from the base station 110 and transmit an uplink signal by an idle radio resource among the assigned candidates.

As a result, in the unlicensed band shared with another wireless communications system, a wireless signal transmitted from the terminal 120 to the base station 110 by a radio resource assigned by the base station 110 has a lower possibility of not being transmitted consequent to interference from another wireless communications system. Therefore, the success rate of wireless signal transmission from the terminal 120 to the base station 110 may be increased, enabling throughput to be enhanced.

Concerning a second embodiment, portions differing from the first embodiment will be described. In the second embodiment, a case will be described in which the base station 110 assigns utilization resources to plural terminals 120 (for example, users 1 to 3).

Figure 9:
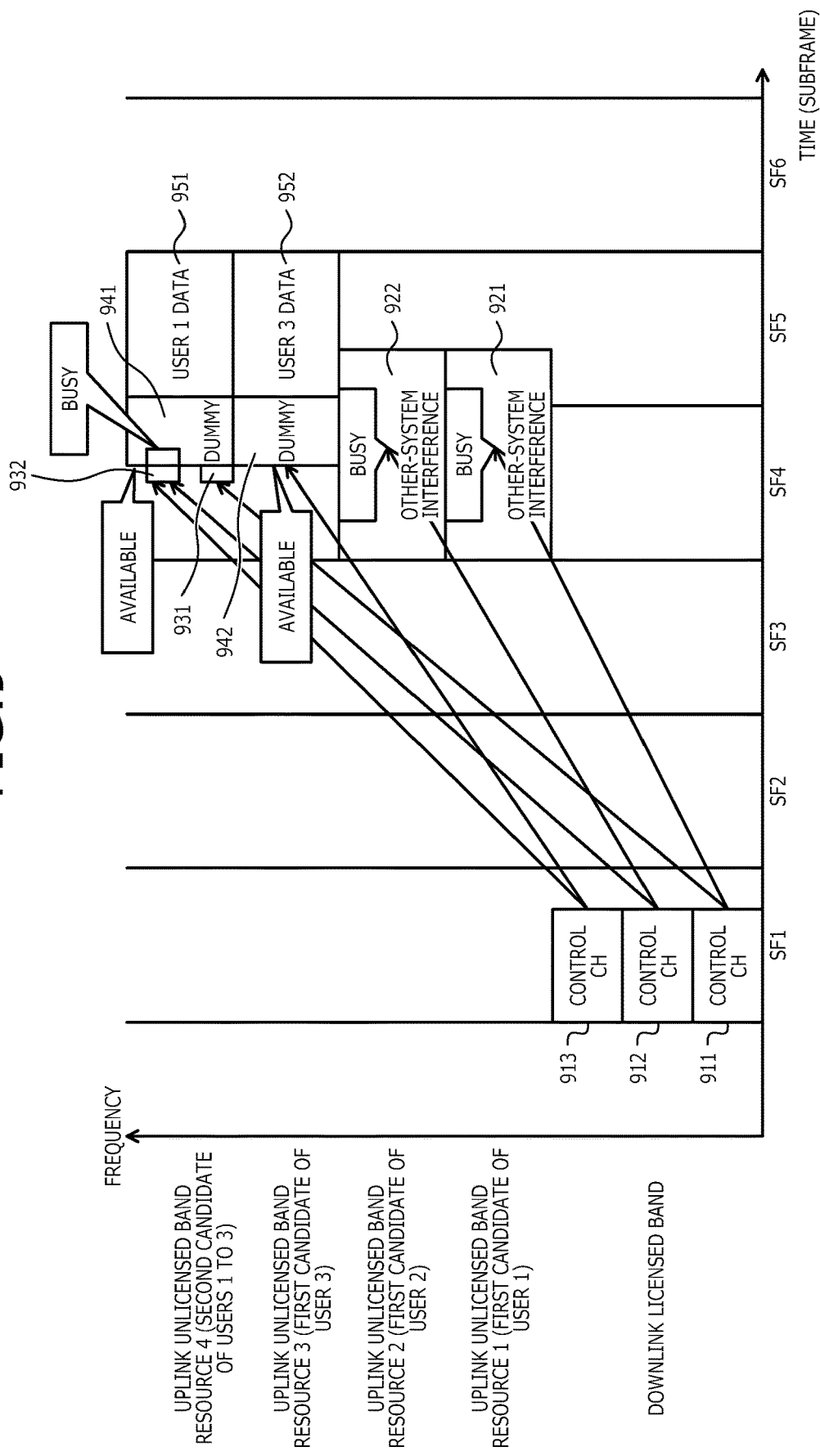
FIG. 9 is a diagram of an example of uplink communication in the wireless communications system according to a second embodiment.

FIG. 9 is a diagram of an example of uplink communication in the wireless communications system according to the second embodiment. In FIG. 9, the horizontal axis represents time (subframe) and the vertical axis represents frequency. A downlink licensed band on the vertical axis is a band used in wireless transmission from the base station 110 to the terminal 120, in the licensed band. Resources 1 to 4 of an uplink unlicensed band on the vertical axis are radio resources included in the unlicensed band.

The terminal 120 depicted in FIGS. 4A and 4B, for example, may be applied as the users 1 to 3. The resources 1 to 3 are each a radio resource set by the base station 110 as a first candidate for a utilization resource for uplink data transmission for the users 1 to 3. The resource 4 is a radio resource set by the base station 110 as a second candidate for a utilization resource for uplink data transmission for the users 1 to 3.

In this manner, in the second embodiment, the base station 110 sets the same radio resource as the second candidate for a utilization resource for uplink data transmission for plural terminals. In the example depicted in FIG. 9, among four resources (the resources 1 to 4) of the unlicensed band, the base station 110 sets three resources (the resources 1 to 3) as the first candidate for the users 1 to 3, respectively, and sets the remaining resource 4 as a second candidate common to the users 1 to 3.

The users 1 to 3, when the first candidates respectively set for the terminals are not idle, transmit uplink data by the second candidate. Further, the users 1 to 3, when transmitting uplink data by the second candidate (the resource 4), perform a backoff process and only when a channel of the resource 4 is idle at the time when a backoff duration expires, transmit uplink data.

The backoff durations of the users 1 to 3 are set by the base station 110 to respectively differ and are notified to the users 1 to 3. Alternatively, the backoff durations of the users 1 to 3 may be set therefor by the users 1 to 3, based on a random number.

Control CHs 911 to 913 are control CHs transmitted to plural terminals (the users 1 to 3) by the base station 110, using the downlink licensed band. In the example depicted in FIG. 9, the control CHs 911 to 913 are transmitted at a head of a subframe SF1.

The control CH 911 includes information assigning the first candidate (the resource 1) and the second candidate (the resource 4) for a utilization resource for the transmission of uplink data from the user 1 to the base station 110. The control CH 912 includes information assigning the first candidate (the resource 2) and the second candidate (the resource 4) for a utilization resource for the transmission of uplink data from the user 2 to the base station 110. The control CH 913 includes information assigning the first candidate (the resource 3) and the second candidate (the resource 4) for a utilization resource for the transmission of uplink data from the user 3 to the base station 110.

A time region of the resources 1 to 4, for example, is a subframe SF5 four subframes after the subframe SF1 at which the control CHs 911 to 913 are transmitted.

The user 1 performs a carrier sense for a band that includes the first candidate (the resource 1) for a utilization resource, based on the control CH 911, in a subframe SF4 immediately before the subframe SF5. In the example depicted in FIG. 9, the user 1 is assumed to determine that the first candidate (the resource 1) is busy consequent to other-system interference 921.

In this case, the user 1 stands by for a backoff interval 931 corresponding to the user 1 and in the backoff interval 931, performs a carrier sense for the resource 4. In the example depicted in FIG. 9, since the resource 4 is idle in the backoff interval 931, the user 1 transmits a dummy signal 941 (dummy) by the resource 4 until the head of the subframe SF5. The user 1 transmits an uplink data 951 (the user 1 data) of the user 1 in the subframe SF5, by the resource 4.

The user 2 performs a carrier sense for a band that includes the first candidate (the resource 2) for a utilization resource, based on the control CH 912, in the subframe SF4 immediately before the subframe SF5. In the example depicted in FIG. 9, the user 2 is assumed to determine that the first candidate (the resource 2) is busy consequent to other-system interference 922. In this case, the user 2 stands by for a backoff interval 932 corresponding to the user 2 and performs a carrier sense for the resource 4 in the backoff interval 932. In the example depicted in FIG. 9, since the resource 4 is busy consequent to the dummy signal 941 from the user 1 in the backoff interval 932, the user 2 does not transmit uplink data.

The user 3 performs a carrier sense for a band that includes the first candidate (the resource 3) for a utilization resource, based on the control CH 913, in the subframe SF4 immediately before the subframe SF5. In the example depicted in FIG. 9, the user 3 is assumed to determine that the first candidate (the resource 3) is idle. In this case, the user 3 transmits a dummy signal 942 (dummy) by the resource 3 until the head of the subframe SF5. The user 3 transmits uplink data 952 (the user 3 data) of the user 3 by the resource 3 in the subframe SF5.

Figure 10:
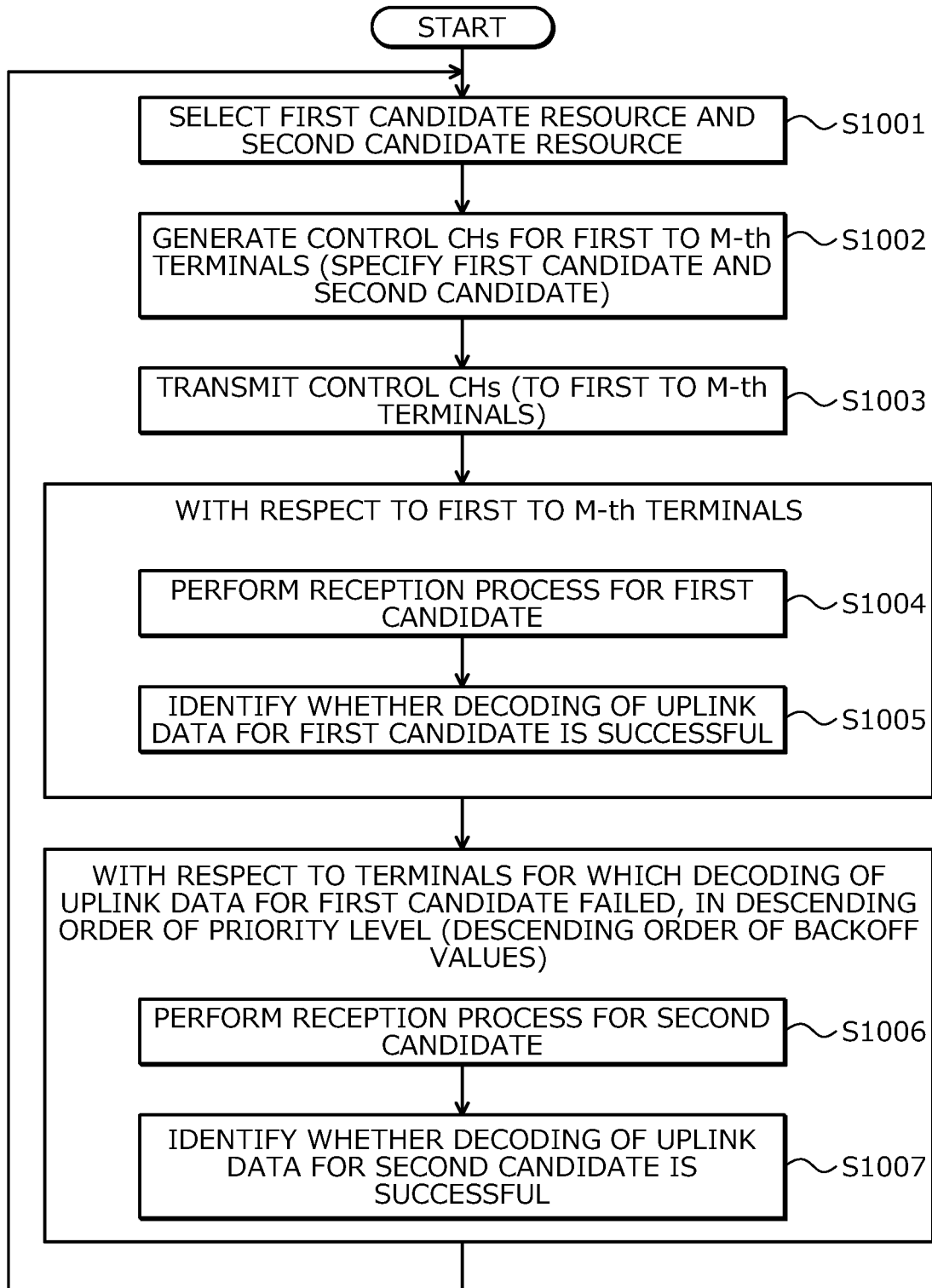
FIG. 10 is a flowchart of an example of a process by the base station according to the second embodiment.

FIG. 10 is a flowchart of an example of a process by the base station according to the second embodiment. The base station 110 according to the second embodiment, for example, executes the steps depicted in FIG. 10. In FIG. 10, a case will be described in which communication is performed between the base station 110 and first to M-th terminals. M, for example, is an integer of 2 or greater. First, the base station 110 selects a first candidate resource for a utilization resource for each of the first to M-th terminals and a second candidate resource common to the first to M-th terminals (step S1001).

Next, the base station 110 generates control CHs for the first to M-th terminals (step S1002). The control CHs generated at step S1002 are control CHs that are based on a result of the selection at step S1001 and that assign the first candidates and the second candidate for a utilization resource for transmitting uplink data from the first to M-th terminals to the base station 110. Next, the base station 110 transmits the control CHs generated at step S1002 to the first to M-th terminals (step S1003).

Next, the base station 110 executes steps S1004 and S1005 with respect to the first to M-th terminals. First, the base station 110 performs a reception process for the first candidate assigned by the control CH transmitted at step S1003 with respect to a target terminal among the first to M-th terminals (step S1004). Next, the base station 110 identifies whether the decoding of uplink data from the target terminal for the first candidate in the reception process at step S1004 was successful or failed (step S1005).

Next, the base station 110, based on a result of the identification at step S1005 and in descending order of priority level, executes steps S1006 and S1007 with respect to the terminals for which the decoding of uplink data for the first candidate failed. Descending order of priority level, for example, is a decreasing (descending) order of the set backoff values (backoff durations).

First, the base station 110, with respect to a target terminal among the first to M-th terminals, performs a reception process for the second candidate assigned by the control CH transmitted at step S1003 (step S1006). Next, the base station 110 identifies whether the decoding of uplink data from the target terminal for the second candidate in the reception process at step S1006 was successful or failed (step S1007). When having executed steps S1006 and S1007 with respect to each of the terminals, the base station 110 returns to step S1001.

In FIG. 10, although a case has been described in which two candidates (a first candidate and a second candidate) for an uplink utilization resource are assigned, the process may assign N candidates for an uplink utilization resource. In the present example, although case is described in which the second candidate is common to the first to M-th terminals, in assignment of the second candidate, the first to M-th terminals may be dispersed and assigned to plural resources.

Figure 11:
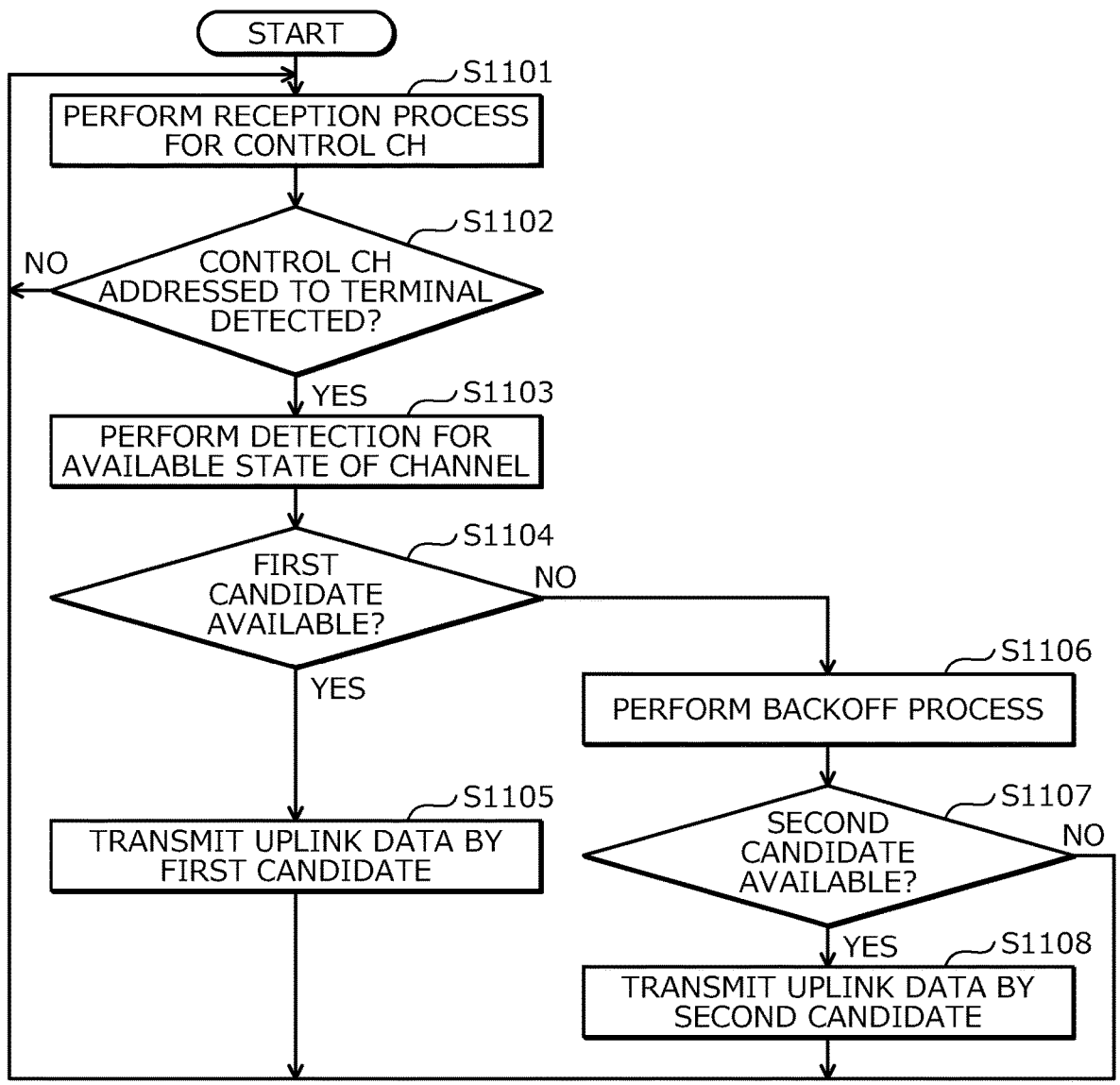
FIG. 11 is a flowchart of an example of a process by the terminal according to the second embodiment.

FIG. 11 is a flowchart of an example of a process by the terminal according to the second embodiment. The terminal 120 according to the second embodiment, for example, may be applied to the users 1 to 3 and/or the first to M-th terminals described above. The terminal 120 according to the second embodiment, for example, executes the steps depicted in FIG. 11. Steps S1101 to S1105 depicted in FIG. 11 are identical to steps S601 to S605 depicted in FIG. 6.

At step S1104, when the first candidate is not idle (step S1104: NO), the terminal 120 performs a backoff process of standing by for the backoff duration of the terminal 120 and performing a carrier sense (step S1106), and transitions to step S1107. Step S1107 and S1108 are identical to steps S606 and S607 depicted in FIG. 6.

Further, when the terminal 120 transmits uplink data at steps S1105 and S1108, if there is time until the subframe for transmitting the uplink data, the terminal 120 may transmit a dummy signal by the resource that is to transmit uplink data.

In FIG. 11, although a case is described in which two candidates (the first candidate and the second candidate) are assigned for an uplink utilization resource, the process may assign N candidates for an uplink utilization resource.

Thus, according to the second embodiment, effects identical to those obtained by the first embodiment are obtained and the base station 110 may overlap and assign the same second candidate to each of the plural terminals 120. Further, each of the terminals 120 may perform by a mutually different backoff duration, idle state detection with respect to the second candidate assigned by the base station 110.

As a result, the same second candidate is assigned to each of the plural terminals 120, enhancing the utilization rate of the radio resources and enabling collision between the terminals 120 at the second candidate to be avoided.

Concerning a third embodiment, portions differing from the first embodiment will be described. In the third embodiment, a case will be described in which the base station 110 assigns utilization resources to plural terminals 120 (for example, the users 1 to 3).

Figure 12:
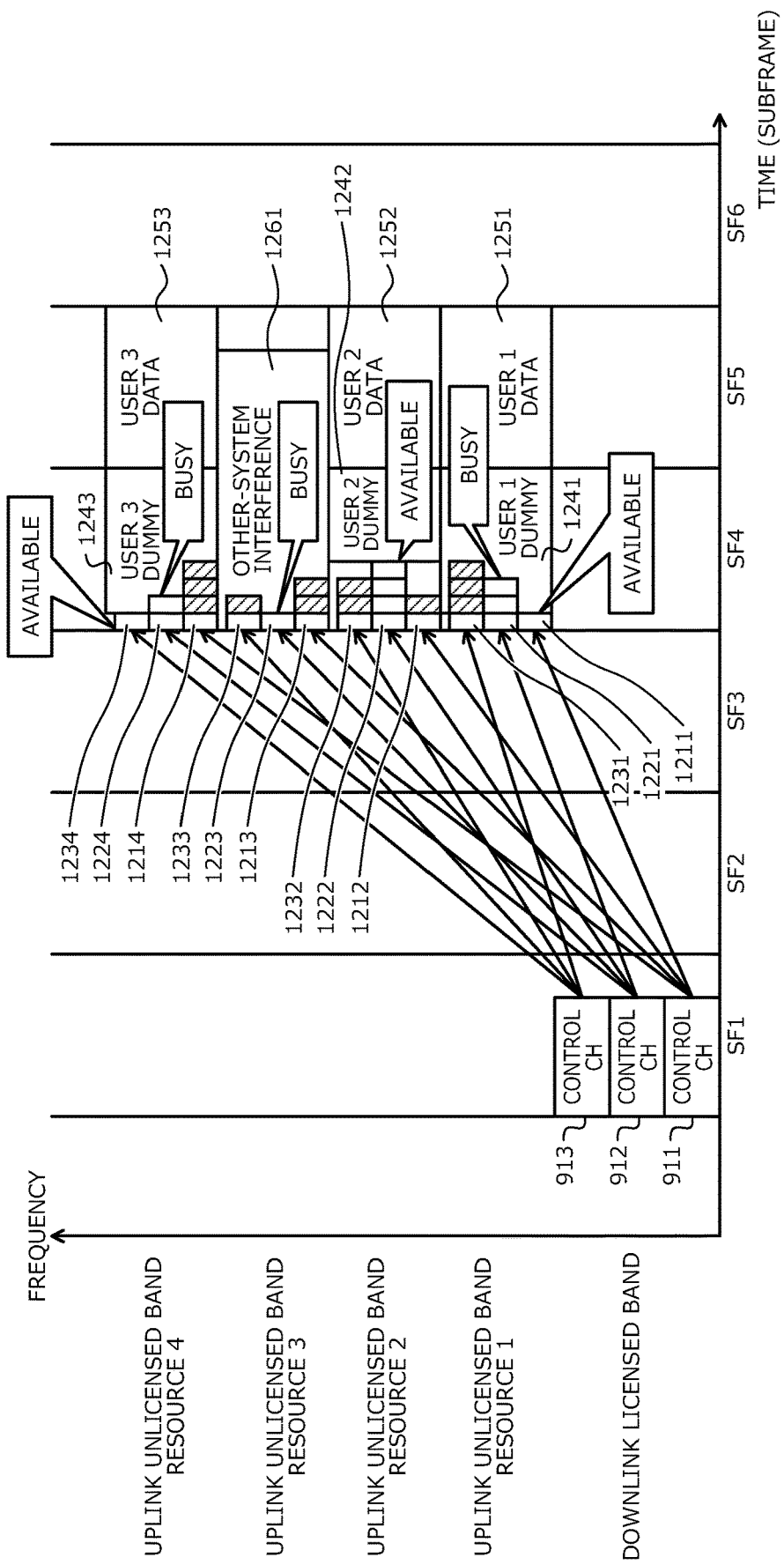
FIG. 12 is a diagram of an example of uplink communication in the wireless communications system according to a third embodiment.

FIG. 12 is a diagram of an example of uplink communication in the wireless communications system according to the third embodiment. In FIG. 12, portions identical to those depicted in FIG. 9 are given the same reference characters used in FIG. 9 and description thereof is omitted hereinafter.

The base station 110 according to the third embodiment permits overlap for the terminals (the users 1 to 3) and assigns plural resources. The terminals perform a backoff process for each resource, secure the resource first detected to be idle, and transmit uplink data. The securing of a resource, for example, may be performed by the transmission of a dummy signal by the resource.

Further, a backoff value for each resource is set in the terminals. Here, for the resources, backoff values differing according to terminal are set. Further, for the terminals, backoff values differing according to resource are set. The backoff values (backoff durations) of the terminals are set by the base station 110 so as to mutually differ and are notified to the terminals. Alternatively, the backoff values of the terminals may be set respectively for the terminals by the terminals based on a random number.

The control CHs 911 to 913 each includes information assigning four candidates for a utilization resource for the transmission of uplink data from the users 1 to 3 to the base station 110. Further, the control CHs 911 to 913 all include information assigning the resources 1 to 4 as the four candidates of a utilization resource.

Backoff intervals 1211 to 1214 are each a backoff interval based on the backoff value set in the user 1 for the resources 1 to 4. The user 1, concerning the resource 1, stands by for the backoff interval 1211 and performs a carrier sense in the backoff interval 1211. Similarly, concerning the resources 2 to 4, the user 1 stands by for the backoff intervals 1212 to 1214 and performs a carrier sense in the backoff intervals 1212 to 1214.

The backoff interval 1221 to 1224 are each a backoff interval based on the backoff value set in the user 2 for the resources 1 to 4. The user 2, concerning the resources 1 to 4, stands by for the backoff intervals 1221 to 1224 and performs a carrier sense in the backoff intervals 1221 to 1224.

The backoff intervals 1231 to 1234 are each a backoff interval based on the backoff value set in the user 3 concerning the resources 1 to 4. The user 3, concerning the resources 1 to 4, stands by for the backoff intervals 1231 to 1234 and performs a carrier sense in the backoff intervals 1231 to 1234.

In the example depicted in FIG. 12, since the user 1 has detected by the backoff interval 1211 that the resource 1 is idle, the user 1 transmits a dummy signal 1241 (the user 1 dummy) and the user data 1251 (the user 1 data) by the resource 1. Since the user 1 has detected the idle state of the resource 1, the user 1 needs not perform the backoff process for the resources 2 to 4 thereafter as depicted by the hatched portions of the backoff intervals 1212 to 1214.

Since the user 3 has detected by the backoff interval 1234 that the resource 4 is idle, the user 3 transmits a dummy signal 1243 (the user 3 dummy) and user data 1253 (the user 3 data) by the resource 4. Since the user 3 has detected the idle state of the resource 4, the user 3 needs not perform the backoff process for the resources 1 to 3 thereafter as depicted by the hatched portions of the backoff intervals 1231 to 1233.

Since the user 2 has determined by the backoff interval 1223 that the resource 3 is busy consequent to other-system interference 1261, the user 2 does not perform data transmission by the resource 3. Further, since the user 2 has determined by the backoff interval 1224 that the resource 4 is busy consequent to the dummy signal 1243 from the user 3, the user 2 does not perform data transmission by the resource 4. Further, since the user 2 has determined by the backoff interval 1221 that the resource 1 is busy consequent to the dummy signal 1241 from the user 1, the user 2 does not perform data transmission by the resource 1.

Since the user 2 has detected by the backoff interval 1222 that the resource 2 is idlebackoff durationidle, the user 2 transmits a dummy signal 1242 (the user 2 dummy) and user data 1252 (the user 2 data) by the resource 2.

In the example depicted in FIG. 12, the user data 1251 to 1253 are transmitted in the subframe SF5, which is four subframes from the subframe SF1 when the control CHs 911 to 913 were transmitted. The dummy signals 1241 to 1243 are transmitted in the subframe SF4 immediately before the subframe SF5.

FIG. 13 is a diagram of an example of backoff values of resources set in the terminals. In the terminals (the users 1 to 3), for example, backoff values (1 to 4) are set for each resource as depicted in a table 1300 in FIG. 13. As depicted in the table 1300, for the resources, backoff values differing according terminal are set. Further, as depicted in the table 1300, for the terminals, backoff values differing according to resource are set.

FIG. 14 is a flowchart of an example of a process by the base station according to the third embodiment. The base station 110 according to the third embodiment, for example, executes the steps depicted in FIG. 14. In FIG. 14, a case will be described in which communication is performed between the base station 110 and the first to M-th terminals; M, for example, is an integer of 2 or greater. First, the base station 110 sets backoff values of resources for the terminals (the first to M-th terminals) (step S1401).

Next, the base station 110 generates control CHs for the first to M-th terminals (step S1402). The control CHs generated at step S1402, for example, are control CHs assigning the resources 1 to 4 as candidates for a utilization resource. Next, the base station 110 transmits the control CHs generated at step S1402 to the first to M-th terminals (step S1403).

Further, the backoff values set at step S1401, for example, may be notified to the terminals by the control CHs transmitted at step S1403. Alternatively, the backoff values set at step S1401 may be notified to the terminals by a signal different from the control CHs transmitted at step S1403.

Next, the base station 110 initializes k (k=1) (step S1404); k is an index of a value that the backoff value may assume (for example, 1 to 4). Further, the backoff values are assumed to be a first backoff value to a K-th backoff value, and the first backoff value<the second backoff value< . . . <the K-th backoff value is further assumed.

Next, the base station 110 performs a reception process for a signal from a terminal for which the decoding of uplink data has not yet been successful, among the terminals for which k-th backoff values have been set for the resources (step S1405). Next, the base station 110 identifies whether the decoding of uplink data step S1405 by the reception process was successful or failed, based on the received signal (step S1406).

Next, the base station 110 determines whether k is less than K (step S1407); K is the maximum value (for example, 4) of the index k. If k is less than K (step S1407: YES), the base station 110 increments k (k=k+1) (step S1408), and returns to step S1405. If k is K or greater (step S1407: NO), the base station 110 returns to step S1401.

FIG. 15 is a flowchart of an example of a process by the terminal according to the third embodiment. The terminal 120 according to the third embodiment, for example, may be applied to each of the users 1 to 3 and/or the first to M-th terminals above. The terminal 120 according to the third embodiment, for example, executes the steps depicted in FIG. 15. Steps S1501 to S1503 depicted in FIG. 15 are identical to steps S601 to S603 depicted in FIG. 6.

Following step S1503, the terminal 120 determines based on the result of detection at step S1503, whether a channel is idle among the resources 1 to 4 (step S1504). If no channel is idle (step S1504: NO), the terminal 120 returns to step S1501. If a channel is idle (step S1504: YES), the terminal 120 performs a backoff process with respect to the idle channel (step S1505).

Next, the terminal 120 determines whether the backoff interval of the backoff process at step S1505 has expired (step S1506). If the backoff interval has not expired (step S1506: NO), the terminal 120 returns to step S1503. If the backoff interval has expired (step S1506: YES), the terminal 120 determines whether the channel for which the backoff interval expired is idle (step S1507).

At step S1507, if the channel for which the backoff interval expired is not idle (step S1507: NO), the terminal 120 returns to step S1503. If the channel for which the backoff interval expired is idle (step S1507: YES), the terminal 120 transmits uplink data by the channel for which the backoff interval expired (step S1508), and returns to step S1501.

Further, when the terminal 120 is to transmit the uplink data at step S1508, if there is time until the subframe for transmitting the uplink data, the terminal 120 may transmit a dummy signal by the resource for transmitting the uplink data.

In this manner, according to the third embodiment, effects identical to those of the first embodiment are obtained and the base station 110 may assign to each of the terminals 120, a first candidate and a second candidate for a utilization resource, with overlap of the terminals 120.

Further, each of the terminals 120 may detect the idle state of the first candidate by a first backoff duration and may detect the idle state of the second candidate by a second backoff duration. The second backoff duration is a backoff duration that is longer than the first backoff duration. Further, the first backoff duration and the second backoff duration are periods that differ between the terminals 120.

For example, in the example depicted in FIG. 12, the first candidate of the user 1 is the resource 1 and the first backoff duration of the user 1 is the backoff interval 1211. The second candidate of the user 1 is the resource 2 and the second backoff duration of the user 1 is the backoff interval 1212. In the example depicted in FIG. 12, the resources 3 and 4 are also set as third and fourth candidates for the user 1; and third and fourth backoff durations corresponding to the third and fourth candidates of the user 1 are the backoff intervals 1213 and 1214, respectively.

Further, in the example depicted in FIG. 12, the first candidate of the user 2 is the resource 3 and the first backoff duration of the user 2 is the backoff interval 1223. The second candidate of the user 2 is the resource 4 and the second backoff duration of the user 2 is the backoff interval 1224. In the example depicted in FIG. 12, the resources 1 and 2 are also set as the third and fourth candidates for the user; and the third and fourth backoff durations corresponding to the third and fourth candidates of the user 2 are the backoff intervals 1221 and 1222, respectively.

Further, in the example depicted in FIG. 12, the first candidate of the user 3 is the resource 4 and the first backoff duration of the user 3 is the backoff interval 1234. The second candidate of the user 3 is the resource 3 and the second backoff duration of the user 3 is the backoff interval 1233. In the example depicted in FIG. 12, the resources 2 and 1 are also set as the third and fourth candidates for the user 3; and the third and fourth backoff durations corresponding to the third and fourth candidates of the user 3 are the backoff intervals 1232 and 1231, respectively.

As a result, a first candidate and a second candidate for a utilization resource may be assigned to each of the terminals 120 with overlap, the utilization rate of radio resources may be enhanced and collision between the terminals 120 may be avoided.

Concerning a fourth embodiment, portions differing from the first embodiment will be described. In the fourth embodiment, a case will be described in which the base station 110 assigns a utilization resource to the terminals 120 (for example, the users 1 and 2).

Figure 16A:
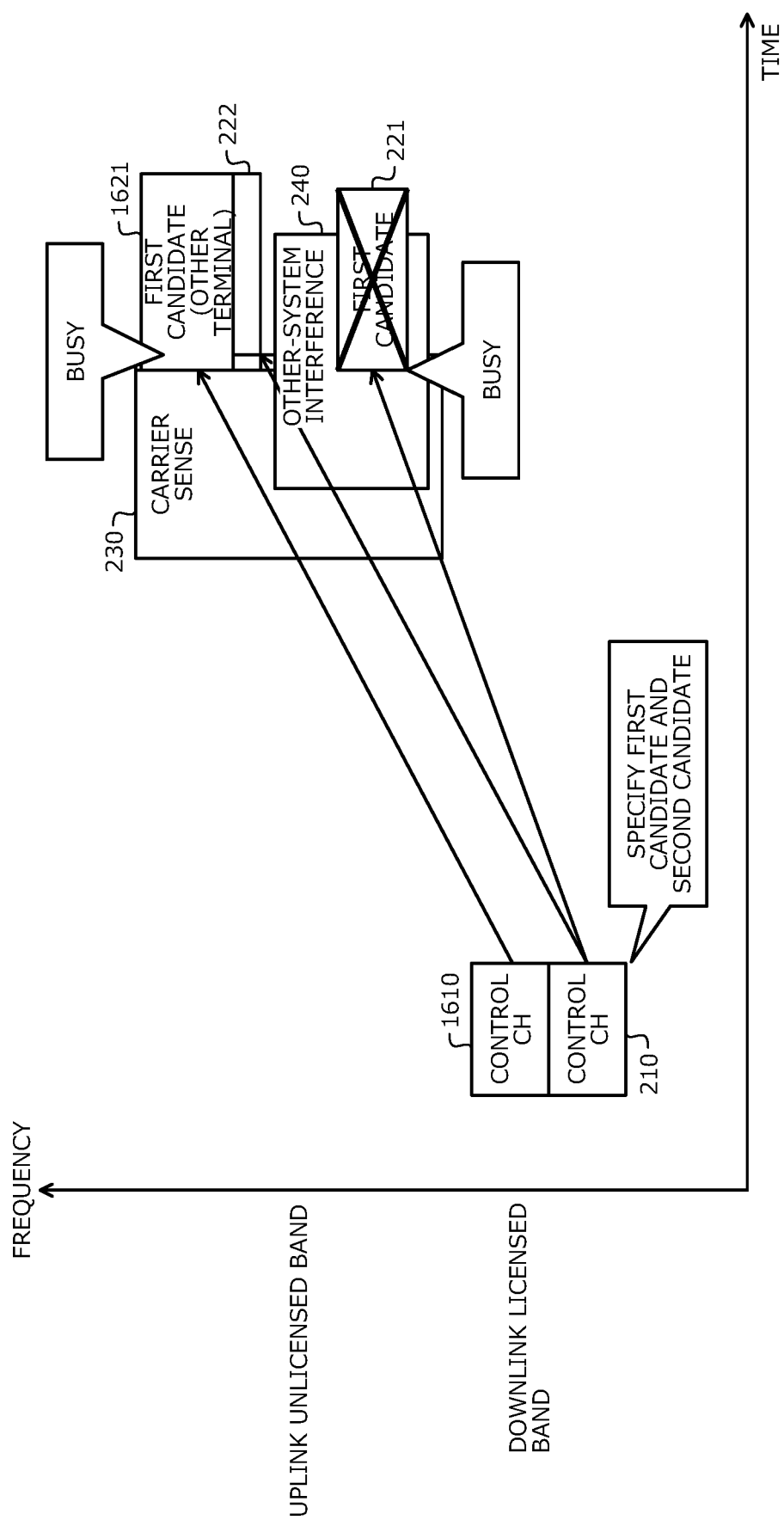
FIG. 16A is a diagram (part 1) of an example of uplink communication in the wireless communications system according to a fourth embodiment.

FIGS. 16A and 16B are diagrams of an example of uplink communication in the wireless communications system according to the fourth embodiment. In FIGS. 16A and 16B, portions identical to those depicted in FIG. 2 are given the same reference characters used in FIG. 2 and description thereof will be omitted hereinafter.

The base station 110 according to the fourth embodiment, concerning uplink utilization resources, permits the first candidate of a terminal and the second candidate of another terminal to overlap and be assigned to the same resource, and assigns first candidates and second candidates to the terminals. The terminals delay the timing of the idle state determination for the respective second candidates thereof by carrier sense to be later than that for the first candidate.

As a result, when the second candidate of a terminal is used by another terminal as the first candidate, the terminal may detect that the second candidate thereof is busy. Further, when the second candidate of the terminal is not used by another terminal as the first candidate, the terminal may delay the transmission start timing and transmit uplink data. Therefore, collision between users may be avoided.

For example, when a terminal performs transmission by the second candidate, the terminal regards the first symbol of the first candidate as a carrier sense interval. The terminal performs puncturing at the first symbol and transmits uplink data by the second candidate from the second symbol only when the terminal determines that based on the carrier sense, the second candidate thereof is not being used as the first candidate of another terminal. The base station 110 may decode the uplink data from the terminal 120, including the punctured portion, for example, by using error correction code.

FIG. 16A depicts a case in which a first candidate 1621 of another terminal (for example, the user 2) is assigned to a resource overlapping the second candidate 222 of the terminal 120 (for example, the user 1). A control CH 1610 depicted in FIG. 16A is a control CH transmitted by the base station 110 to the other terminal by a downlink licensed band. The control CH 1610 includes information assigning the first candidate 1621 and a second candidate (not depicted in FIG. 16A) for a utilization resource for transmitting uplink data from the other terminal to the base station 110. The first candidate 1621 assigned by the control CH 1610 overlaps the second candidate 222 of the terminal 120 assigned by the control CH 210.

The terminal 120 determines that from the result of the carrier sense 230, the first candidate 221 is busy (Busy) consequent to the other-system interference 240. Further, the terminal 120 delays the timing of the idle state determination for the second candidate 222 thereof and thereby, determines that the second candidate 222 overlaps the first candidate 1621 of the other terminal. In this case, the terminal 120 does not transmit uplink data.

FIG. 16B depicts a case in which the first candidate of another terminal is not assigned to a resource overlapping the second candidate 222 of the terminal 120 (for example, the user 1), or a case in which the other terminal has failed in detecting the control CH. In the example depicted in FIG. 16B, the terminal 120 determines that the second candidate 222 is idle. In this case, the terminal 120 transmits uplink data to the base station 110 by the second candidate 222 without transmitting uplink data to the base station 110 by the first candidate 221.

FIG. 17 is a flowchart of an example of a process by the base station according to the fourth embodiment. The base station 110 according to the fourth embodiment, for example, executes the steps depicted in FIG. 17. Steps S1701 to S1709 depicted in FIG. 17 are identical to steps S501 to S509 depicted in FIG. 5.

However, at step S1701, the base station 110 permits overlapping and assignment of the second candidate of the terminal 120 and the first candidate of another terminal to the same resource, and generates a control CH based on the result of the assignment of the first candidate and the second candidate to the terminal 120.

Further, at step S1706, the base station 110, with respect to a signal after a predetermined period, performs a reception process for the second candidate assigned for the terminal 120 by the control CH transmitted at step S1702 (step S1706). For example, the base station 110 attempts wireless signal decoding for a radio resource corresponding to the second candidate, from a time point when a period of one symbol from the head of the subframe corresponding to the second candidate elapses.

In FIG. 17, although a case has been described in which two candidates (the first candidate and the second candidate) for an uplink utilization resource are assigned, the process may assign N candidates for an uplink utilization resource.

Figure 18:
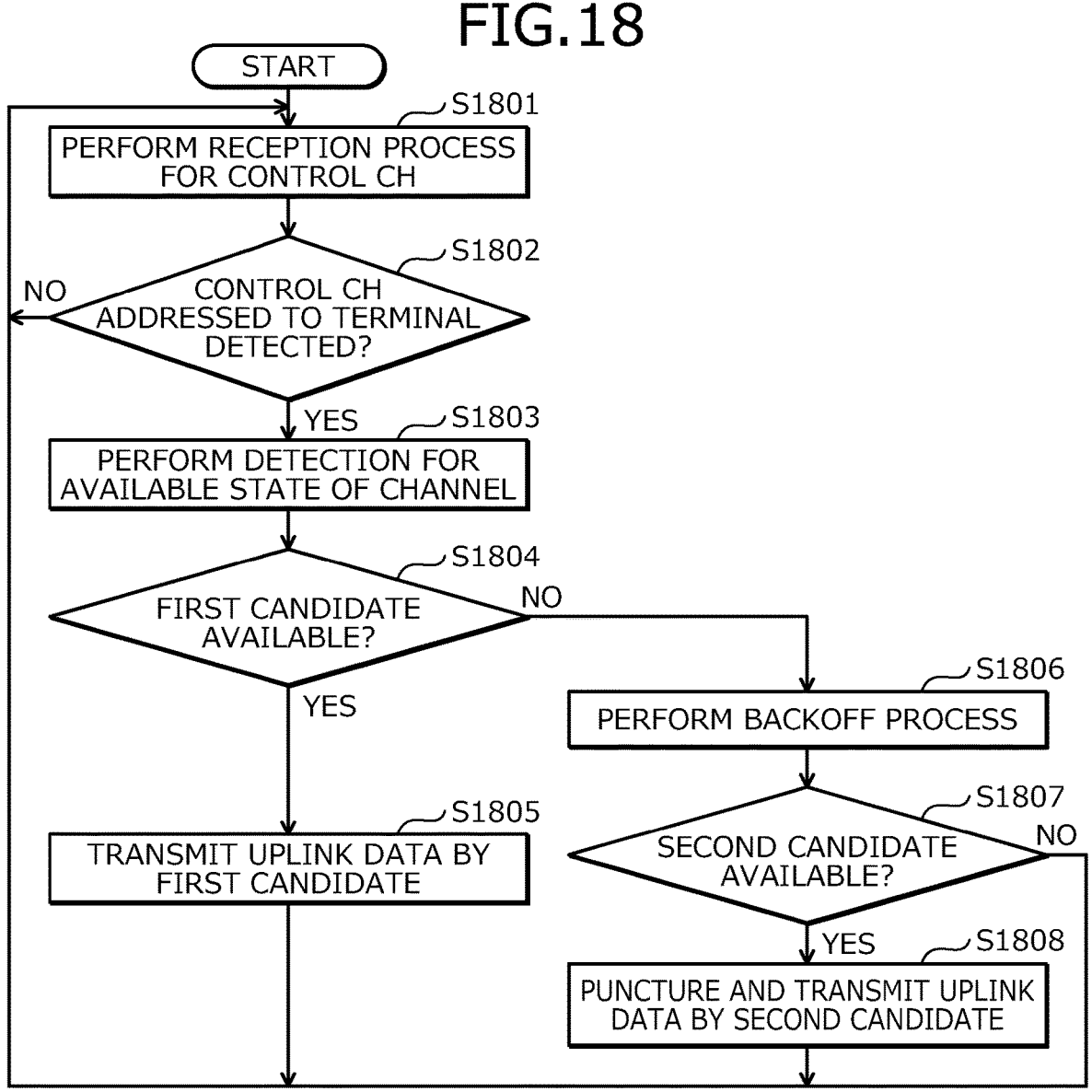
FIG. 18 is a flowchart of an example of a process by the terminal according to the fourth embodiment.

FIG. 18 is a flowchart of an example of a process by the terminal according to the fourth embodiment. The terminal 120 according to the fourth embodiment, for example, executes the steps depicted in FIG. 18. Steps S1801 to S1808 depicted in FIG. 18 are identical to steps S1101 to S1108 depicted in FIG. 11.

However, at step S1808, the terminal 120 punctures and transmits the uplink data by the second candidate to the base station 110 (step S1808). For example, the terminal 120 punctures the uplink data for one symbol and transmits the uplink data to the base station 110.

Further, when the terminal 120 transmits the uplink data at steps S1805 and S1808, if there is time until the subframe for transmitting the uplink data, the terminal may transmit a dummy signal by the resource that is to transmit the uplink data.

In FIG. 18, although a case has been described in which two candidates (the first candidate and the second candidate) are assigned for an uplink utilization resource, the process may assign N candidates for an uplink utilization resource.

Examples of operation by the present embodiment will be described according to traffic states. First, a case in which there is a lot of traffic of the wireless communications system 100 without another wireless communications system operating in the unlicensed band will be described. In this case, according to the present embodiment, since no collisions occur with another wireless communications system, even if overlapping assignment is permitted, the terminals may perform transmission by the first candidate. Therefore, the channels may be used efficiently without collisions between users.

Next, a case will be described in which there is a lot traffic of the wireless communications system 100 and another wireless communications system is operating in the unlicensed band. In this case, according to the present embodiment, concerning the second candidate, the first symbol is used as a carrier sense interval whereby the terminals do not transmit a wireless signal in a case of use as the first candidate of another terminal. Therefore, collisions may be avoided.

Next, a case will be described in which there is little traffic of the wireless communications system 100 and another wireless communications system is operating in the unlicensed band. In this case, according to the present embodiment, although the second candidate cannot perform transmission at the first symbol, loss consequent not being able to transmit a wireless signal may be suppressed.

Figure 19A:
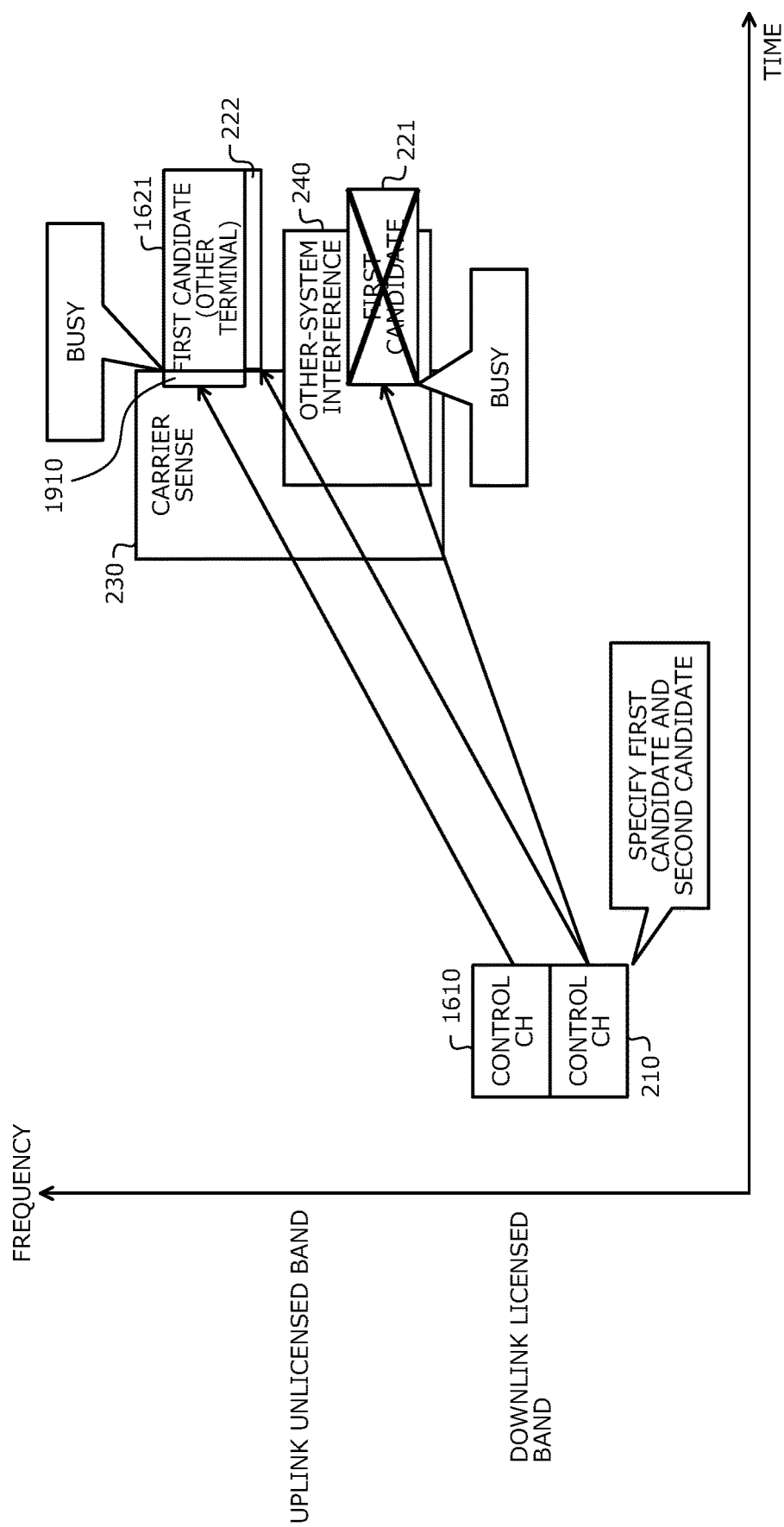
FIG. 19A is a diagram (part 1) of an example of uplink communication in the wireless communications system according to a modification example of the fourth embodiment.
Figure 19B:
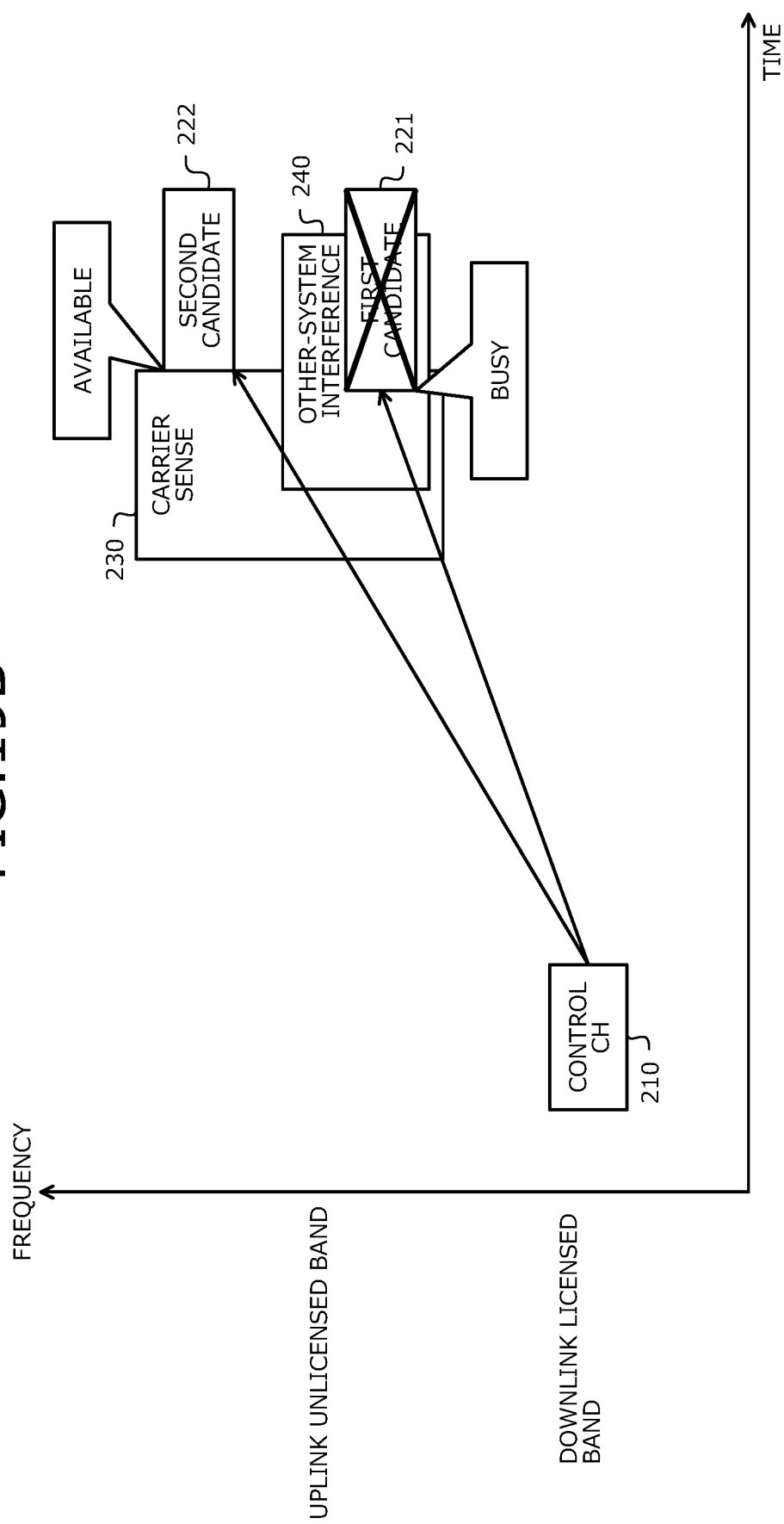
FIG. 19B is a diagram (part 2) of an example of uplink communication in the wireless communications system according to a modification example of the fourth embodiment.

FIGS. 19A and 19B are diagrams of an example of uplink communication in the wireless communications system according to a modification example of the fourth embodiment. In FIGS. 19A and 19B, portions identical to those depicted in FIGS. 16A and 16B will be given the same reference characters used in FIGS. 16A and 16B and description thereof will be omitted hereinafter.

The terminals according to the modification example of the fourth embodiment, with respect to the first candidate, preform a carrier sense at a symbol two or more symbols before an end of the subframe before the first candidate. The terminal, when determining that based on the result of the carrier sense, the first candidate is idle, transmits a dummy from an end portion of the subframe before the first candidate and subsequently transmits a data signal.

FIG. 19A depicts a case in which the first candidate 1621 of another terminal (for example, the user 2) is assigned to a resource overlapping the second candidate 222 of the terminal 120 (for example, the user 1). A dummy signal 1910 depicted in FIG. 19A is a dummy signal transmitted by the other terminal at an end portion of the subframe before the subframe of the first candidate 1621 of the other terminal. In this case, the other terminal may transmit uplink data from the head of the subframe of the first candidate of the other terminal without performing puncturing.

In the example depicted in FIG. 19A, the terminal 120 detects the dummy signal 1910 at an end portion of the subframe before the second candidate (the first candidate of the other terminal) of the terminal 120 whereby the second candidate of the terminal 120 may be determined to be busy. In this case, the terminal 120 does not transmit uplink data.

FIG. 19B depicts a case in which the first candidate of another terminal is not assigned to a resource overlapping the second candidate 222 of the terminal 120 (for example, the user 1), or a case in which the other terminal fails in detecting the control CH.

In the example depicted in FIG. 19B, in the subframe before the subframe of the second candidate 222 of the terminal 120, the terminal 120 may determine that the second candidate 222 thereof is idle. In this case, the terminal 120 may transmit uplink data to the base station 110 from the head of the subframe of the second candidate 222.

A process of the base station 110 according to a modification example of the fourth embodiment, for example, is identical to the process depicted in FIG. 17.

Figure 20:
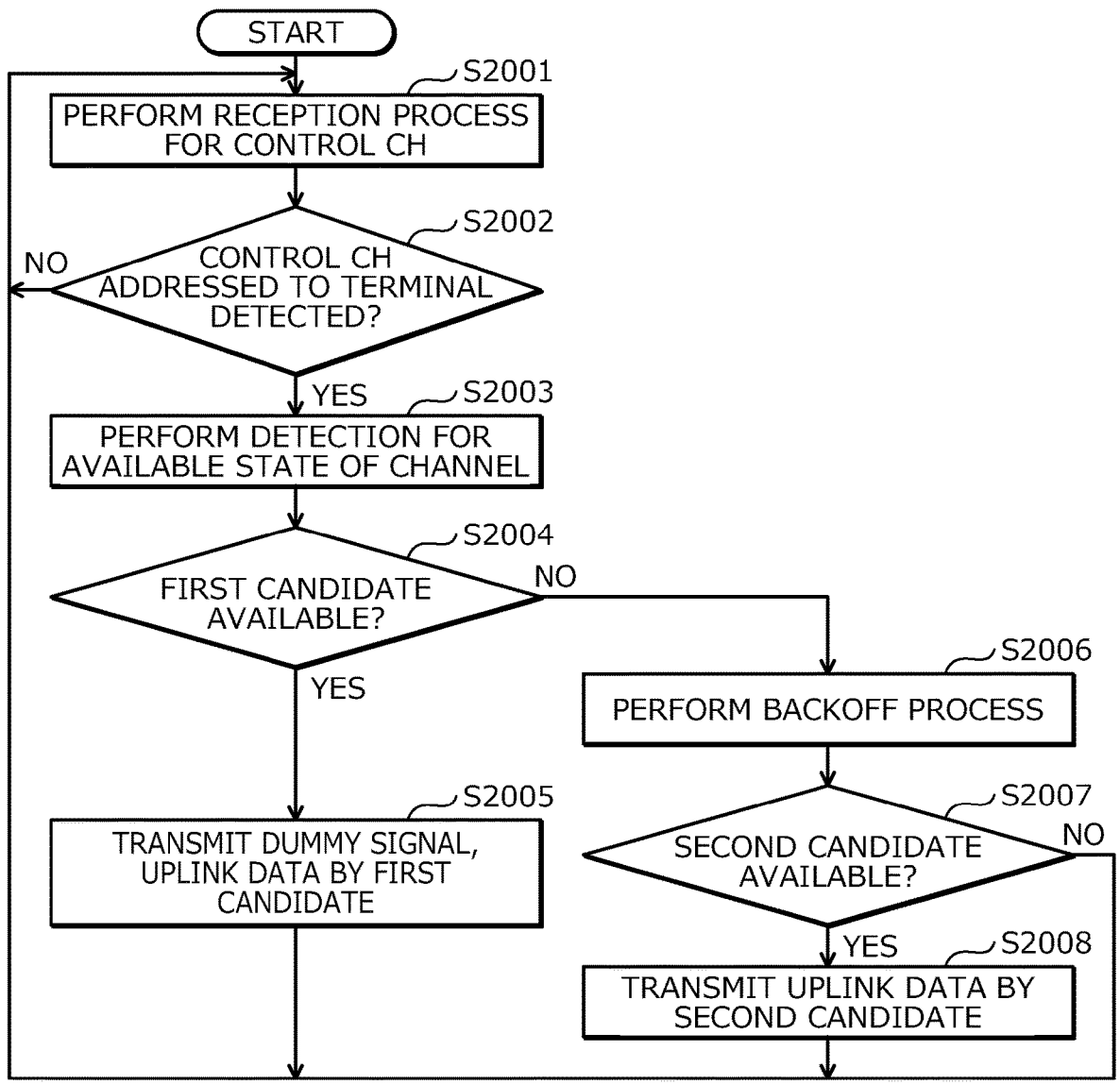
FIG. 20 is a flowchart of an example of a process by the terminal according to a modification example of the fourth embodiment.

FIG. 20 is a flowchart of an example of a process by the terminal according to a modification example of the fourth embodiment. The terminal 120 according to the modification example of the fourth embodiment, for example, executes the steps depicted in FIG. 20. Steps S2001 to S2008 depicted in FIG. 20 are identical to steps S1101 to S1108 depicted in FIG. 11.

However, at step S2003, the terminal 120, with respect to the first candidate for a utilization resource assigned by the detected control CH addressed to the terminal, detects the idle state of a channel by a symbol two or more symbols before an end of the subframe before the first candidate (step S2003).

Further, at step S2005, the terminal 120 transmits a dummy signal and uplink data to the base station 110 by the first candidate (step S2005). For example, the terminal 120 transmits a dummy from an end portion of the subframe before the first candidate and subsequently transmits a data signal from the head of the subframe of the first candidate.

In this manner, according to the fourth embodiment, effects identical to those of the first embodiment are obtained. Further, the base station 110 may assign to a first terminal 120, a first candidate overlapping the second candidate assigned to a second terminal 120, and a second candidate overlapping the first candidate assigned to the second terminal 120.

Further, each of the plural terminals 120 (the first terminal 120 and the second terminal 120) may perform detection of the idle state of the second candidate assigned thereto, at a timing after the detection for the idle state of the first candidate assigned thereto.

As a result, first candidates and second candidates of a utilization resource may be assigned to the terminals 120 with overlap, enabling the utilization efficiency of radio resources to be enhanced and collisions between the terminals 120 to be avoided.

Concerning a fifth embodiment, portions differing from the first embodiment will be described.

Figure 21:
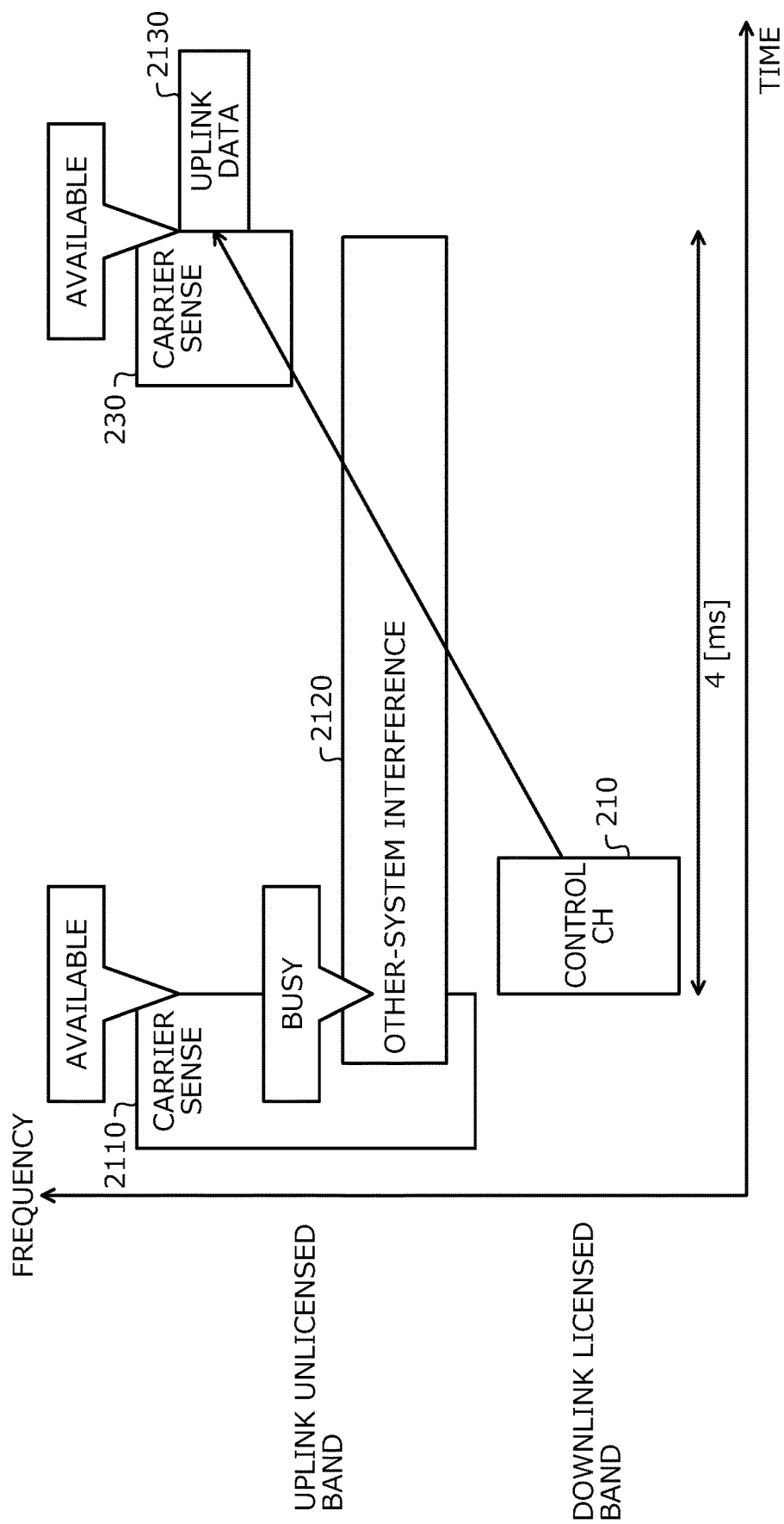
FIG. 21 is a diagram of an example of uplink communication in the wireless communications system according to a fifth embodiment.

FIG. 21 is a diagram of an example of uplink communication in the wireless communications system according to the fifth embodiment. In FIG. 21, portions identical to those depicted in FIG. 2 are given the same reference characters used in FIG. 2 and description thereof is omitted hereinafter.

The base station 110 according to the fifth embodiment performs a carrier sense 2110 for the uplink unlicensed band before transmitting the control CH 210 and assigns the resources detected to be idle by the carrier sense 2110 as a utilization resource of the terminal 120. The carrier sense 2110, for example, is a carrier sense in a frequency carrier assigned to uplink communication under Frequency Division Duplex (FDD).

In the fifth embodiment, the base station 110 may assign one utilization resource to the terminal 120 and not set plural candidates for a utilization resource for the terminal 120. In the example depicted in FIG. 21, the base station 110 detects, in the carrier sense 2110, other-system interference 2120 (other system) in the uplink unlicensed band and assigns to the terminal 120, a utilization resource without the other-system interference 2120, in the uplink unlicensed band.

The base station 110 uses the control CH 210 to assign to the terminal 120, the one utilization resource assigned to the terminal 120. The terminal 120 performs the carrier sense 230 for the utilization resource assigned by the control CH 210 and when determining that the utilization resource is idle, transmits uplink data 2130 to the base station 110 by the utilization resource.

A resource detected to be idle by the base station 110 in advance has a high possibility of continuing to be idle even at the time of transmission by the terminal 120. Therefore, instances in which the utilization resource assigned to the terminal 120 is busy at the time of transmission by the terminal 120 and the terminal 120 becomes unable to transmit the uplink data 2130 to the base station 110 may be suppressed.

Figure 22:
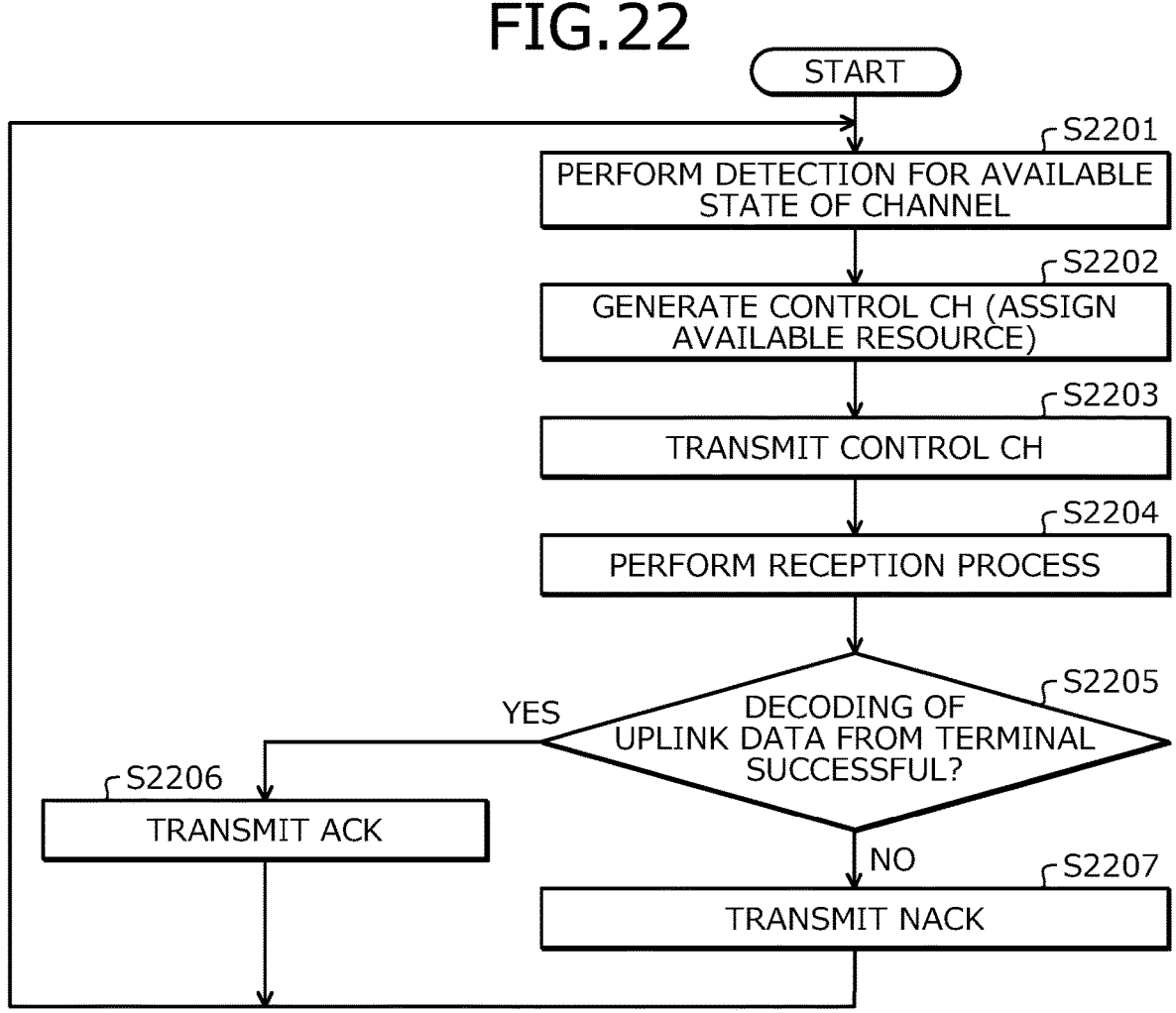
FIG. 22 is a flowchart of an example of a process by the base station according to the fifth embodiment.

FIG. 22 is a flowchart of an example of a process by the base station according to the fifth embodiment. The base station 110 according to the fifth embodiment, for example, executes the steps depicted in FIG. 22. First, the base station 110 detects an idle state of a channel in the uplink unlicensed band (step S2201).

Next, the base station 110 performs scheduling for the terminal 120 based on the result of the detection at step S2201 and generates a control CH based on the scheduling result (step S2202). For example, the base station 110 assigns an idle resource detected at step S2201 to the terminal 120 and generates a control CH assigning the resource.

The base station 110 transmits to the terminal 120, the control CH generated at step S2202 (step S2203). Next, the base station 110 performs a reception process for the utilization resource assigned by the control CH transmitted at step S2203 (step S2204). For example, the base station 110 attempts wireless signal decoding for the assigned utilization resource. Next, the base station 110 determines whether decoding of uplink data from the terminal 120 was successful in the reception process at step S2204 (step S2205).

At step S2205, if the decoding was successful (step S2205: YES), the base station 110 transmits an ACK (acknowledgement) to the terminal 120 (step S2206), and returns to step S2201. If the decoding was not successful (step S2205: NO), the base station 110 transmits a NACK (negative acknowledgement) to the terminal 120 (step S2207), and returns to step S2201.

Figure 23:
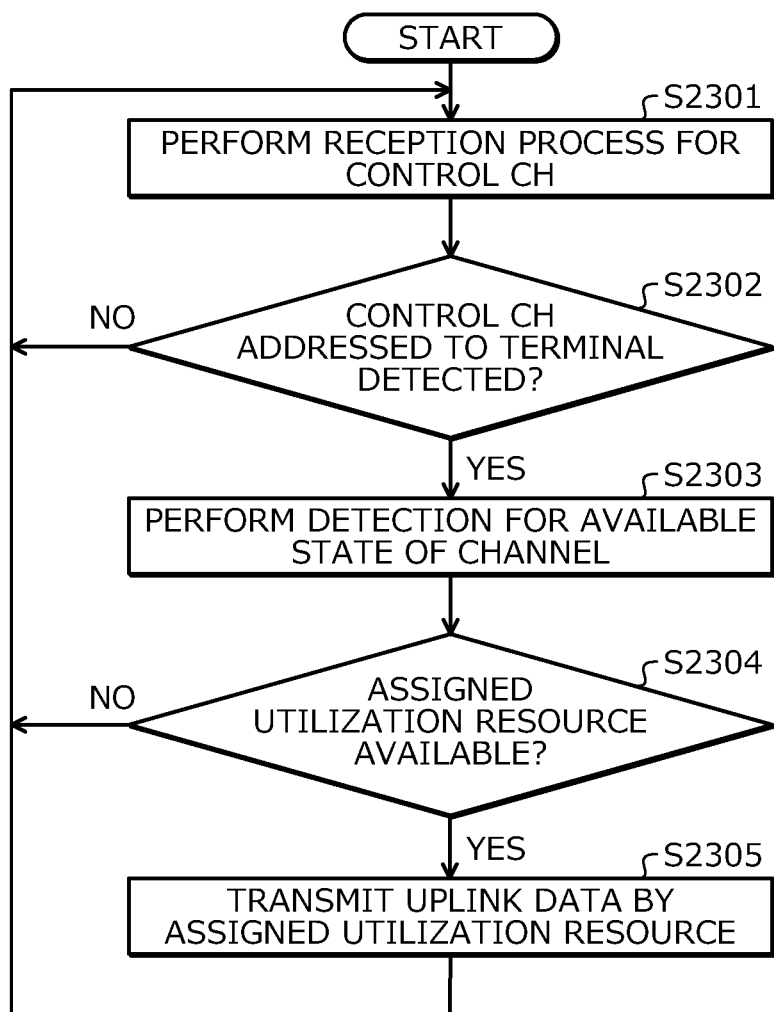
FIG. 23 is a flowchart of an example of a process by the terminal according to the fifth embodiment.

FIG. 23 is a flowchart of an example of a process by the terminal according to the fifth embodiment. The terminal 120 according to the fifth embodiment, for example, executes the steps depicted in FIG. 23. Steps S2301 to S2303 depicted in FIG. 23 are identical to steps S601 to S603 depicted in FIG. 6.

After step S2303, the terminal 120 determines whether the utilization resource assigned to the terminal 120 is idle, based on the result of the detection at step S2303 (step S2304). If the assigned utilization resource is idle (step S2304: YES), the terminal 120 transmits uplink data to the base station 110 by the assigned utilization resource (step S2305), and returns to step S2301.

At step S2304, if the assigned utilization resource is not idle (step S2304: NO), the terminal 120 returns to step S2301 without transmitting uplink data to the base station 110.

In this manner, according to the fifth embodiment, the base station 110 may perform a carrier sense in the unlicensed band and assign to the terminal 120, a radio resource detected to be idle by the carrier sense. A resource detected to be idle by the base station 110 in advance has a high possibility of continuing to be idle at the time of transmission by the terminal 120 and therefore, the success rate of wireless signal transmission from the terminal 120 to the base station 110 may be increased, enabling throughput to be enhanced.

Concerning a sixth embodiment, portions differing from the first embodiment will be described. The sixth embodiment is a combination of the first embodiment and the fifth embodiment.

Figure 24:
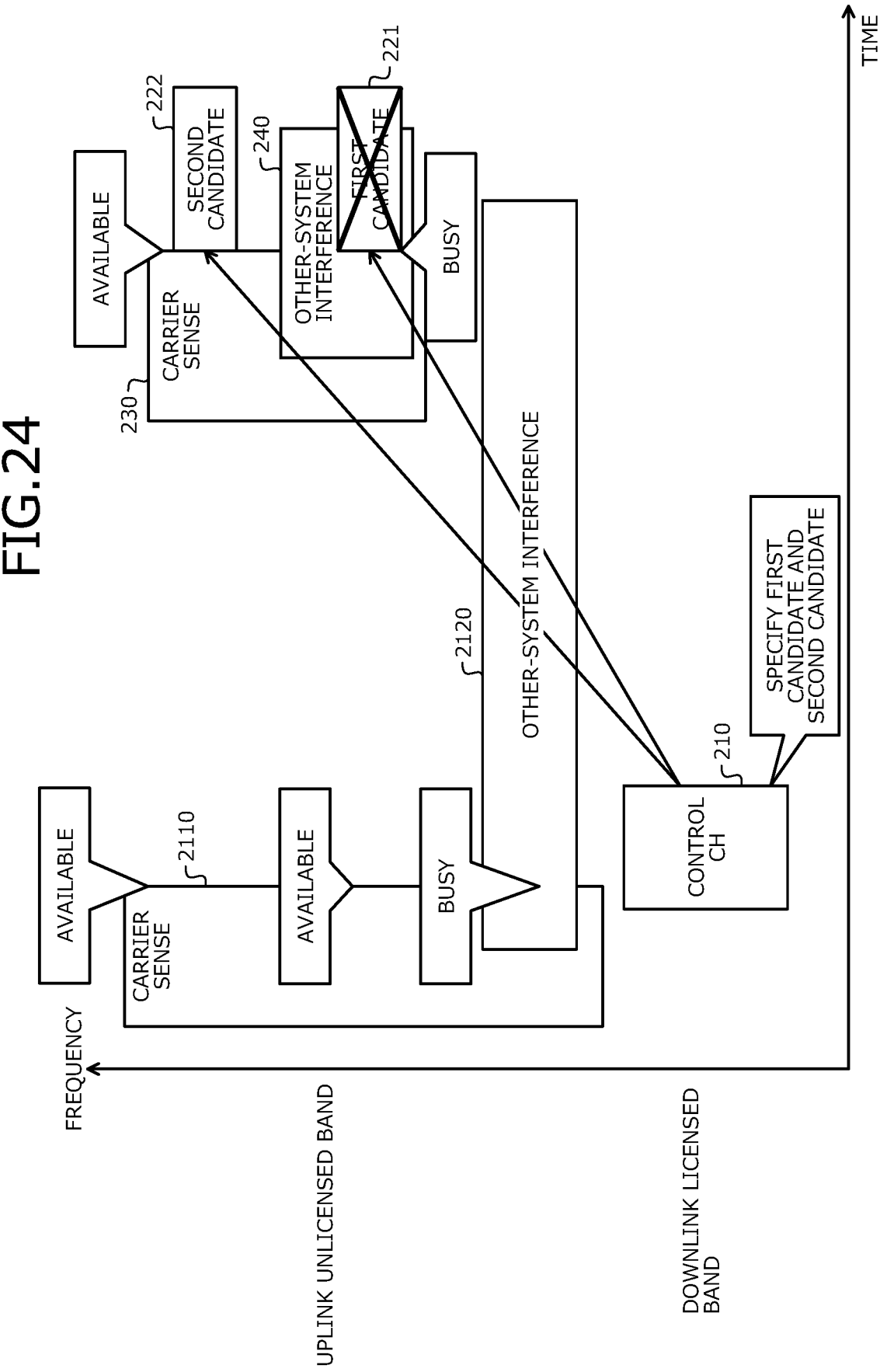
FIG. 24 is a diagram of an example of uplink communication in the wireless communications system according to a sixth embodiment.

FIG. 24 is a diagram of an example of uplink communication in the wireless communications system according to the sixth embodiment. In FIG. 24, portions identical to those depicted in FIG. 2 or FIG. 21 are given the same reference characters used in FIG. 2 or FIG. 21, and description thereof is omitted hereinafter.

The base station 110 according to the sixth embodiment performs the carrier sense 2110 for an uplink resource before transmitting the control CH 210. The base station 110 sets the first candidate 221 and the second candidate 222 for a utilization resource of the terminal 120, from among the resources detected to be idle by the carrier sense 2110. The base station 110 uses the control CH 210 to assign to the terminal 120, the set first candidate 221 and second candidate 222. The terminal 120 transmits uplink data to the base station 110 by at least one of the first candidate 221 and the second candidate 222 assigned by the control CH 210.

Resources detected to be idle by the base station 110 in advance have a high possibility of continuing to be idle at the time of transmission by the terminal 120. Therefore, instances in which the first candidate 221 and the second candidate 222 set in the terminal 120 become busy at the time of transmission by the terminal 120 and the terminal 120 becomes unable to transmit data to the base station 110 may be suppressed.

Further, even when the base station 110 performs the carrier sense 2110 for the unlicensed band before transmitting the control CH 210 and confirms the idle state of resources, from transmission of the control CH 210, there is an interval of about 4 [ms] between the first candidate 221 and the second candidate 222. In this interval, even if the other-system interference 240 occurs, if the second candidate 222 is idle, the second candidate 222 is used and a wireless signal may be transmitted from the terminal 120 to the base station 110.

FIG. 25 is a flowchart of an example of a process by the base station according to the sixth embodiment. The base station 110 according to the sixth embodiment, for example, executes the steps depicted in FIG. 25. First, the base station 110 detects an idle state of a channel in the uplink unlicensed band (step S2501).

Steps S2502 to S2510 depicted in FIG. 25 are identical to steps S501 to S509 depicted in FIG. 5. However, the control CH generated at step S2502 is a control CH assigning a first candidate and a second candidate selected from among resources detected to be idle at step S2501.

A process by the terminal according to the sixth embodiment, for example, is identical to the process depicted in FIG. 6.

In this manner, according to the sixth embodiment, effects identical to those of the first embodiment are obtained. Further, the base station 110 performs a carrier sense in the unlicensed band and assigns to the terminal 120, a first candidate and a second candidate included among radio resources detected to be idle by the carrier sense. As a result, both the first candidate and the second candidate assigned to the terminal 120 have a low possibility of becoming unusable consequent to interference from another system. Therefore, the success rate of wireless signal transmission from the terminal 120 to the base station 110 may be increased, enabling throughput to be enhanced. As the sixth embodiment, although a configuration combining the first embodiment and the fifth embodiment has been described, the configuration may be a combination of the fifth embodiment and the second to fourth embodiments. In other words, in the second to fourth embodiments, the base station 110 may perform a carrier sense in the unlicensed band and assign to the terminal 120, a first candidate and a second candidate included among radio resources detected to be idle by the carrier sense. As a result, both the first candidate and the second candidate assigned to the terminal 120 have a low possibility of becoming unusable consequent to interference from another system. Therefore, the success rate of wireless signal transmission from the terminal 120 to the base station 110 may be increased, enabling throughput to be enhanced.

As described, the wireless communications system, the communications apparatus, and the processing method enable throughput to be enhanced.

For example, under conventional LTE or LTE-A, a base station assigns a utilization resource (for example, CC or a resource block) by a control channel such as E-PDCCH, PDCCH, or the like; and a terminal transmits uplink data by the assigned utilization resource. The uplink data, for example, is a Physical Uplink Shared Channel (PUSCH).

Further, under LTE-Unlicensed, transmission of a control channel by a licensed band and data communication by an unlicensed band is under consideration. For example, a base station transmits by a licensed band, notification using a control channel; and data communication based on the control channel is performed by an unlicensed band.

In such configurations, when the terminal attempts to performs transmission, the utilization resource assigned by the control channel has a possibility of being used by another system or an operator. In this case, the terminal determines that the assigned resource is not idle (busy) and cannot transmit uplink data. Therefore, the success rate of wireless signal transmission from a terminal to the base station may decrease and throughput may decrease.

In contrast, according to the present embodiments, the base station may assign a first candidate and a second candidate for a utilization resource by a control channel. Further, the terminal, when attempting to transmit uplink data, may transmit the uplink data by the first candidate when the first candidate is idle and may transmit the uplink data by the second candidate when the first candidate is busy and the second candidate is idle.

As a result, in an unlicensed band shared with another wireless communications system, the possibility of transmission of a wireless signal from the terminal to the base station by a utilization resource assigned by the base station becoming impossible consequent to interference from another wireless communications system is reduced. Thus, the success rate of (probability of being able to access a channel in) wireless signal transmission from a terminal to the base station increases, enabling throughput to be enhanced.

However, with the conventional techniques above, for example, when a terminal uses, in a shared band, a radio resource assigned by a base station and transmits a wireless signal, another wireless communications system may be using the radio resource. Therefore, throughput may decrease when the wireless signal cannot be transmitted.

According to one aspect of the present invention, an effect is achieved in that throughput may be enhanced.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A wireless communications system including:
a base station; and
a terminal; wherein
the base station comprising:
a transmitter configured to transmit to the terminal using a physical downlink control channel, information used for assignment of first candidate and sec- ond candidate of a utilization resource in an unlicensed band for transmitting a wireless signal; and
a receiver configured to receive the wireless signal from the terminal; and the terminal comprising:
a receiver configured to receive the information; and
a transmitter configured to transmit the wireless signal to the base station using the first candidate when the first candidate is idle, or using the second candidate when the first candidate is not idle and the second candidate is idle; and wherein the assignment of the first candidate and the second candidate by the base station is performed by allocating a plurality of time resources.

2. The wireless communications system according to claim 1, wherein
the unlicensed band is shared with another communications system.

3. The wireless communications system according to claim 1, wherein
the base station receives the wireless signal from the terminal by performing a reception process for the first candidate, and by performing the reception process for the second candidate when the wireless signal from the terminal is not received by the reception process for the first candidate.

4. The wireless communications system according to claim 1, wherein
the base station assigns the first candidate and the second candidate to the terminal for each data transmission from the terminal to the base station.

5. A base station comprising:
a transmitter configured to transmit to a terminal using a physical downlink control channel, information used for assignment of first candidate and second candidate of a utilization resource in an unlicensed band for transmitting a wireless signal; and
a receiver configured to receive the wireless signal from the terminal using the first candidate or using the second candidate;
wherein the assignment of the first candidate and the second candidate by the base station is performed by allocating a plurality of time resources.

6. The base station according to claim 5, wherein
the base station and the terminal are included in a communications system; and
the unlicensed band is shared with another communications system.

7. The base station according to claim 5, wherein
the base station receives the wireless signal from the terminal by performing a reception process for the first candidate, and by performing the reception process for the second candidate when the wireless signal from the terminal is not received by the reception process for the first candidate.

8. The base station according to claim 5, wherein
the base station assigns the first candidate and the second candidate to the terminal for each data transmission from the terminal to the base station.

9. A terminal comprising:
a receiver configured to receive from a base station using a physical downlink control channel, information used for assignment of first candidate and second candidate of a utilization resource in an unlicensed band for transmitting a wireless signal; and
a transmitter configured to transmit the wireless signal to the base station using the first candidate when the first candidate is idle, or using the second candidate when the first candidate is not idle and the second candidate is idle;
wherein the assignment of the first candidate and the second candidate by the base station is performed by allocating a plurality of time resources.

10. The terminal according to claim 9, wherein
the base station and the terminal are included in a communications system; and
the unlicensed band is shared with another communications system.

* * * * *